(12) United States Patent
Rasmussen et al.

(10) Patent No.: US 12,012,759 B2
(45) Date of Patent: Jun. 18, 2024

(54) INTELLIGENT ROOF DRAIN SYSTEMS AND METHODS

(71) Applicant: WATTS REGULATOR CO., North Andover, MA (US)

(72) Inventors: Michael Rasmussen, Fur (DK); Caspar Pilkington Laugesen, Sonderborg (DK); Kristina Juel Bech, Vildbjerg (DK); Thomas Svan Them, Herning (DK)

(73) Assignee: WATTS REGULATOR CO., North Andover, MA (US)

( * ) Notice: Subject to any disclaimer, the term of this patent is extended or adjusted under 35 U.S.C. 154(b) by 204 days.

(21) Appl. No.: 17/520,157

(22) Filed: Nov. 5, 2021

(65) Prior Publication Data

US 2022/0145635 A1     May 12, 2022

Related U.S. Application Data

(60) Provisional application No. 63/116,503, filed on Nov. 20, 2020, provisional application No. 63/110,759, filed on Nov. 6, 2020.

(51) Int. Cl.
*E04D 13/00* (2006.01)
*G08B 21/18* (2006.01)
(Continued)

(52) U.S. Cl.
CPC ......... *E04D 13/006* (2013.01); *G08B 21/182* (2013.01); *G08B 21/20* (2013.01); *G08B 25/10* (2013.01); *H04W 4/38* (2018.02)

(58) Field of Classification Search
CPC .......... E04D 13/006; E04D 2013/0427; E04D 13/0409; G08B 21/182; G08B 21/20; G08B 25/10; H04W 4/38; H04W 12/10
See application file for complete search history.

(56) References Cited

U.S. PATENT DOCUMENTS

| 4,110,945 A | 9/1978 | Sheahan |
| 4,598,273 A | 7/1986 | Bryan, Jr. et al. |

(Continued)

FOREIGN PATENT DOCUMENTS

| CN | 110206237 A | 9/2019 | |
| CN | 110824962 A * | 2/2020 | ............. G01D 21/02 |

(Continued)

OTHER PUBLICATIONS

International Search Report and Written Opinion from corresponding PCT Appln. No. PCT/US2158/236, dated Feb. 4, 2022.
(Continued)

*Primary Examiner* — Steven L Yeninas
*Assistant Examiner* — Dilara Sultana
(74) *Attorney, Agent, or Firm* — Grossman, Tucker, Perreault & Pfleger, PLLC

(57) ABSTRACT

An intelligent roof drain system includes a roof drain surrounded by a drain plate. A water seepage detection module is disposed proximate the drain plate. The water seepage detection module includes water seepage detection sensors and circuitry and an antenna system to inductively receive power and communicate water seepage data. A roofing membrane is disposed over the water seepage detection module. A monitoring module that includes control circuitry, power supply circuitry, water level detection circuitry, communications interface circuitry, and an antenna system to inductively supply power to and communicate with the water seepage detection module is disposed proximate the water seepage detection module such that the antenna systems align. The intelligent roof drain system can detect water seepage under the roofing membrane and standing water proximate the roof drain and communicate such events to a gateway and/or building management system.

18 Claims, 12 Drawing Sheets

(51) Int. Cl.
*G08B 21/20* (2006.01)
*G08B 25/10* (2006.01)
*H04W 4/38* (2018.01)

(56) References Cited

U.S. PATENT DOCUMENTS

| | | | |
|---|---|---|---|
| 4,965,554 | A | 10/1990 | Darling |
| 6,225,909 | B1 | 5/2001 | Nill, Jr. |
| 7,646,309 | B2 | 1/2010 | Visser |
| 8,604,799 | B2 | 12/2013 | Roedel et al. |
| 9,624,671 | B1 * | 4/2017 | Gunness ............... E04D 13/006 |
| 9,632,003 | B1 | 4/2017 | Gunness |
| 9,989,397 | B1 * | 6/2018 | Kinney .................. G08B 21/20 |
| 10,171,892 | B2 | 1/2019 | Petrachek et al. |
| 10,214,907 | B1 | 2/2019 | Gunness |
| 10,571,141 | B1 | 2/2020 | Gray et al. |
| 10,579,028 | B1 | 3/2020 | Jacob |
| 2006/0033629 | A1 | 2/2006 | Froeter et al. |
| 2011/0178747 | A1 | 7/2011 | Gunness |
| 2012/0062384 | A1 | 3/2012 | McDanal et al. |
| 2014/0361796 | A1 | 12/2014 | Vokey et al. |
| 2015/0269830 | A1 | 9/2015 | Beldon |
| 2018/0054662 | A1 * | 2/2018 | Petrachek ............... E04D 13/00 |
| 2018/0202163 | A1 * | 7/2018 | Vokey .................... G01D 5/165 |
| 2019/0224510 | A1 | 7/2019 | Goyette et al. |
| 2020/0209112 | A1 * | 7/2020 | Deivasigamani .... G05B 23/024 |

FOREIGN PATENT DOCUMENTS

| | | | | |
|---|---|---|---|---|
| DE | 202019102015 | U1 | 4/2019 | |
| EP | 2662845 | A2 | 11/2013 | |
| EP | 2662845 | A3 | 4/2016 | |
| EP | 3176341 | B1 | 11/2018 | |
| EP | 2181439 | B1 | 3/2020 | |
| GB | 2353593 | B | 4/2003 | |
| JP | 6091986 | B2 * | 3/2017 | ............ E04D 13/04 |
| NO | 300938 | B1 | 8/1997 | |
| WO | 9429822 | A1 | 12/1994 | |

OTHER PUBLICATIONS

"Fasteners for the Flat Roof", Guardian Brochure, pp. 1-40, 2019.
"The Smarter Way to Protect your Roof", Smartex Brochure, downloaded from www.intercoast-building-solutions.com on Mar. 10, 22.
International Search Report and Written Opinion from corresponding PCT Appln. No. PCT/US21/58246, dated Feb. 4, 2022. 7 pages.
International Preliminary Report on Patentability from corresponding PCT Appln. No. PCT/US21/58246, dated May 8, 2023.
International Preliminary Report on Patentability from corresponding PCT Appln. No. PCT/US21/58236, dated May 8, 2023.
Office Action from corresponding U.S. Appl. No. 18/143,984, dated Aug. 23, 2023. 21 pages.
Extended European Search Report from related Application No. 21890145.2, dated Nov. 24, 2023. 36 pages.
Extended European Search Report from related Application No. 21890142.9, dated Nov. 3, 2023. 10 pages.

* cited by examiner

INTELLIGENT ROOF DRAIN SYSTEMS AND METHODS

CROSS REFERENCE TO RELATED APPLICATION

This application claims the benefit of U.S. Provisional Patent Application No. 63/110,759, filed Nov. 6, 2020 and claims the benefit of U.S. Provisional Patent Application No. 63/116,503, filed Nov. 20, 2020, both of which are incorporated by reference herein in their entirety.

TECHNICAL FIELD

The present disclosure is generally directed to roof drainage systems and methods, more particularly to systems and methods of detecting abnormal conditions proximate a roof drain.

BACKGROUND INFORMATION

Roof construction includes a roof substructure that is typically not a waterproof that is subsequently covered by another material, such as a roofing membrane, that provides the waterproof integrity to the roof. Roof drains may be positioned at locations across the roof to drain water from the roof to an offsite location such as a storm sewer or retention pond. Since the roof drain must connect to a stormwater management system, penetrations through the roofing membrane are needed at each roof drain. In addition, seams/overlaps in the roofing membrane, cables, sky windows, ventilation shafts, and damage to the roofing membrane can also result in penetrations through the roofing membrane.

These penetrations become potential pathways for the ingress of water. If a roof drain becomes plugged with debris or detritus, water may collect or pond around the drain. This water retention may lead to several, potentially catastrophic, situations. First, the water increases the loading on the roof due to the weight of the retained water. Second, the standing water may seep between the roofing membrane and the roof structure, potentially causing rot on wood framed roof structures, fungus and associated health issues, and corrosion on metal framed roof structures thereby weakening the roof structure. Third, leakage may occur into the interior space proximate the roof drain causing damage to interior appointments. Finally, if the roof structure is sufficiently weakened by ingress of water, the extra load presented by the ponding water about a roof drain can cause a structural failure of the roof. A general lack of regular access to the roof compounds the issue as plugged roof drains may go unnoticed for quite some time.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications, and variations thereof will be apparent to those skilled in the art.

DETAILED DESCRIPTION

As used herein, a roofing membrane includes any elastic or inelastic material used to provide waterproof integrity to a roof. Typically, such roofing membranes are disposed proximate a roof structure. Thus, as used herein, the top or upper surface of the roofing membrane should be considered to include all of the roofing membrane exposed or potentially exposed to atmospheric precipitation and/or water contact from other sources such as hoses and the like. As used herein, the bottom or lower surface of the roofing membrane should be considered to include all of the roofing membrane transversely opposite the top or upper surface of the roofing membrane and disposed proximate an underlying roof structure or substructure.

As used herein, a "short-range wireless communication protocol" includes any current or future developed, commercial or proprietary communications protocol capable of facilitating communication between devices such as an intelligent roof drain system and a gateway device. As used herein, such short-range wireless communication protocols are protocols intended for use within a single building or within a single facility and typically will have a range of about 3 miles or less from source to destination.

As used herein, a "long-range wireless communication protocol" includes any current or future developed, commercial or proprietary communications protocol capable of facilitating communication between devices such as a gateway device and a building management system. As used herein, such long-range wireless communication protocols are protocols intended for use worldwide, for example via the Internet, and typically will have a range greater than three miles from source to destination.

Figure 1:
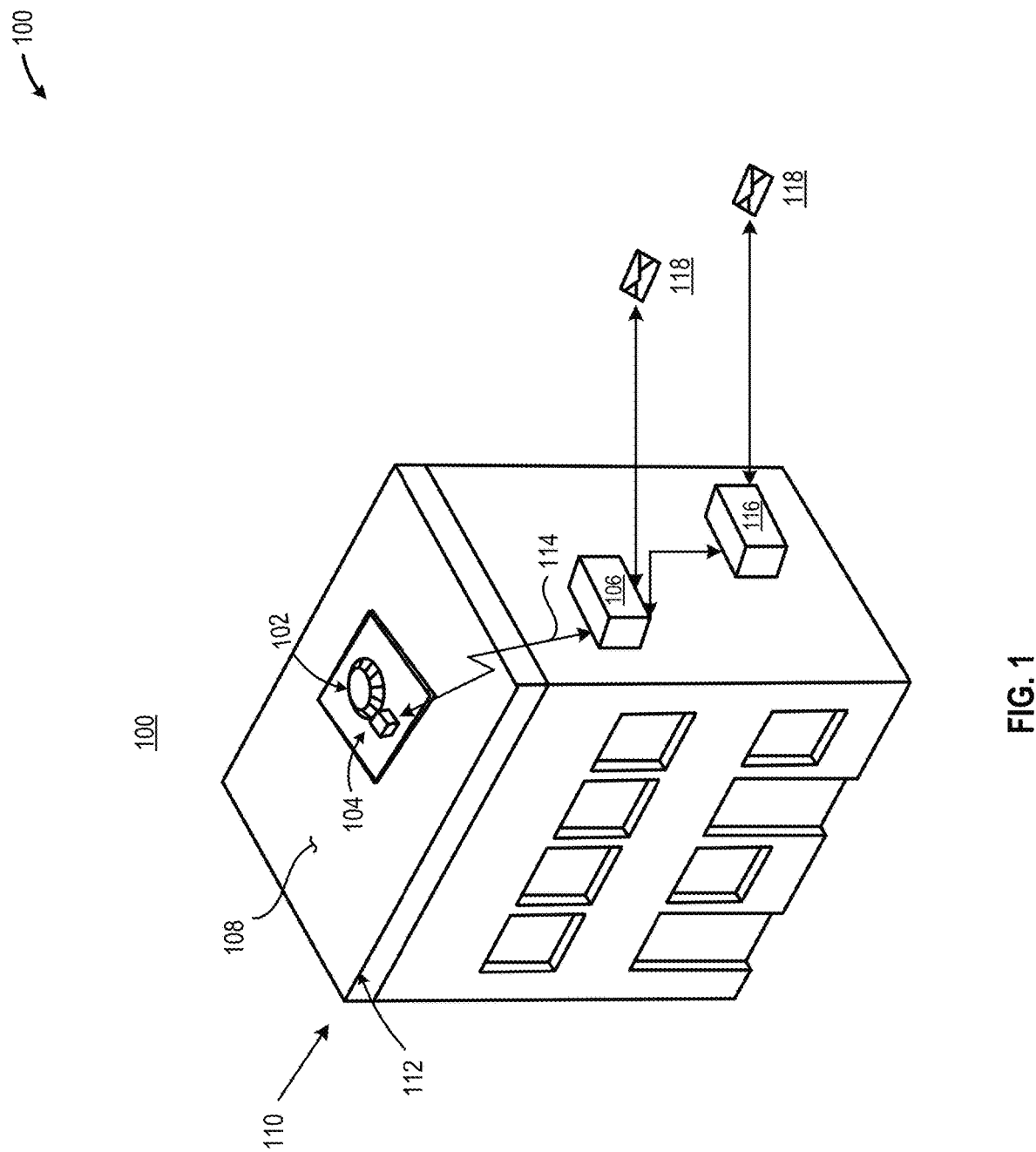
FIG. 1 is a schematic overview that depicts an illustrative intelligent roof drain system, in accordance with at least one embodiment described herein.

FIG. 1 is a schematic overview that depicts an illustrative intelligent roof drain system 100 consistent with at least one example of the present disclosure. The intelligent roof drain system 100 may generally include one or more roof drains 102, one or more detectors 104, and one or more gateways 106. For simplicity, one roof drain 102, one detector 104, and one gateway 106 is shown, but the intelligent roof drain system 100 may include two or more roof drains 102, two or more detectors 104, and/or two or more gateways 106. Each of the roof drains 102 may be disposed to form a regular or irregular pattern of roof drains 102 on the roof 108 of a building 110 and is fluidly coupled to one or more drainage conduits (not shown for clarity) to allow water to drain from the roof 108. At least one detector 104A may be associated with a particular drain 102A.

Each of the detectors 104 may include water seepage detection circuitry to generally monitor for seepage or leakage beneath a roofing membrane 112 disposed on, about, or across at least a portion of the roof 108. Beneficially, the water seepage detection circuitry included in the detector 104 may be disposed beneath the roofing membrane 112 and may be positioned to wirelessly couple with the detector 104 to both receive power from the detector 104 and communicate a leakage or seepage event to the detector 104.

The one or more detectors 104 may additionally include water level detection circuitry to monitor standing or flowing water level on top of the roofing membrane 112. The detector 104 may additionally include transmitter circuitry to transmit at least one output signal 114 to one or more of the gateways 106 that includes information indicative of at least one of: a water seepage condition or event beneath the roofing membrane 112 and/or an abnormal standing or flowing water condition or event on the roofing membrane 112.

At least some of the gateways 106 may include transceiver circuitry to receive a respective output signals 104 generated by each of some or all of the detectors 104. In embodiments, at least some of the gateways 106 may be configured to communicate with a building management system 116 (via one or more wired communications (e.g., Modbus RTU) and/or wireless communications). The building management system 116 may be part of and/or associated with, for example, a building security system, an insurance company, a building management company, a cloud service or the like. The gateway 106 and/or the building management system 116 may be configured to generate a notification 118 upon detection of an abnormal condition (e.g., but not limited to, detection of a water leak beneath the roofing membrane 110, abnormally high drain water levels, low battery power, exceeding maximum or minimum temperatures, icing events, thawing events, etc.). The notification 118 may include but is not limited to, an electromagnetic signal, an optical signal, an auditory alarm, a visual alarm, a text message, an email, a phone call, an alert transmitted via one or more networks such as the Internet, or the like. The roof drain system 100 may be particularly useful on flat roofs, however, it should be appreciated that the roof drain system 100 may be used in any application using an underlayment or similar sealing membrane (e.g., but not limited to, a roofing membrane) with or without a drain.

Figure 2:
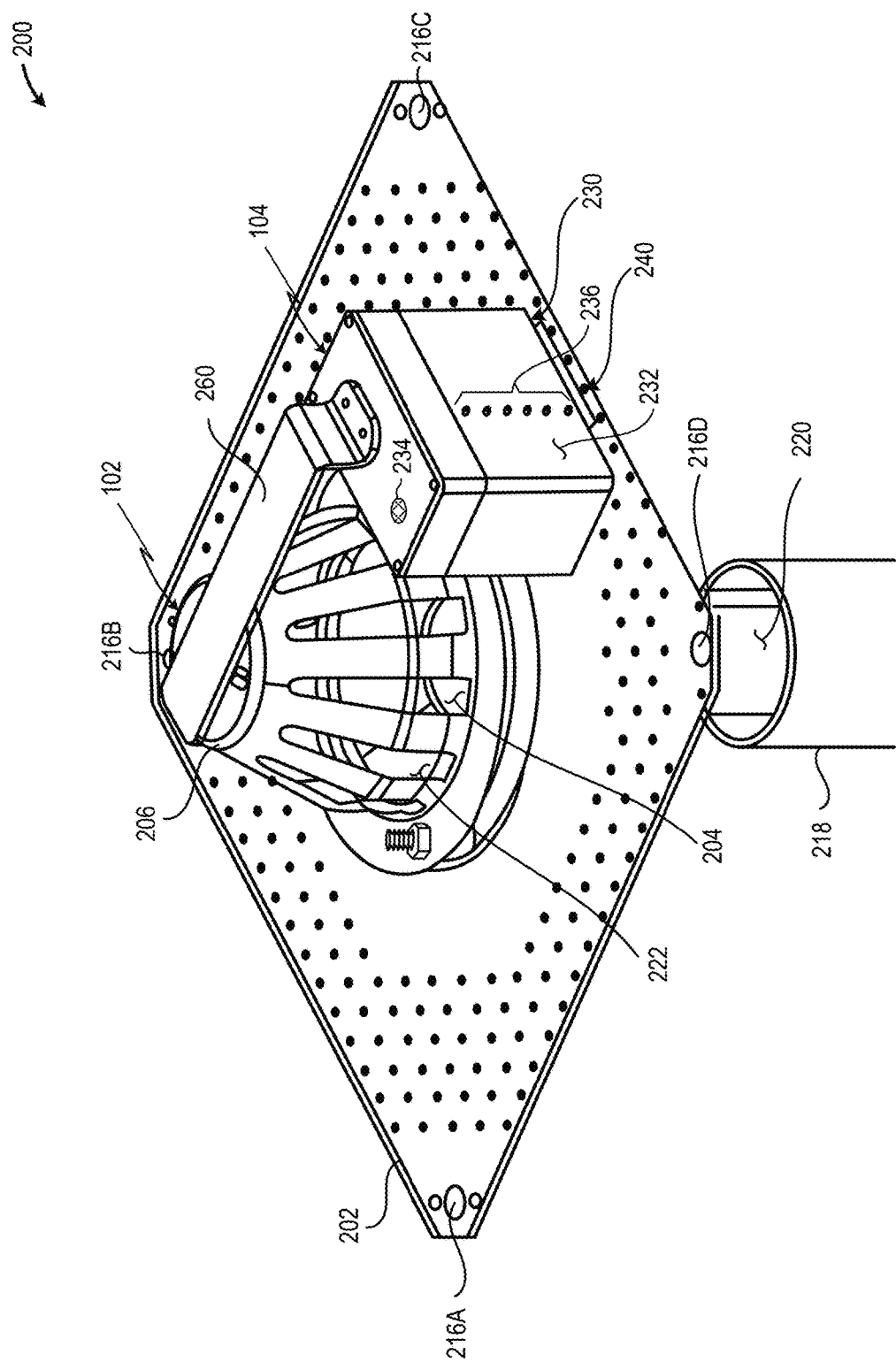
FIG. 2 is a perspective view that depicts an illustrative roof drain system, in accordance with at least one embodiment described herein.
Figure 3:
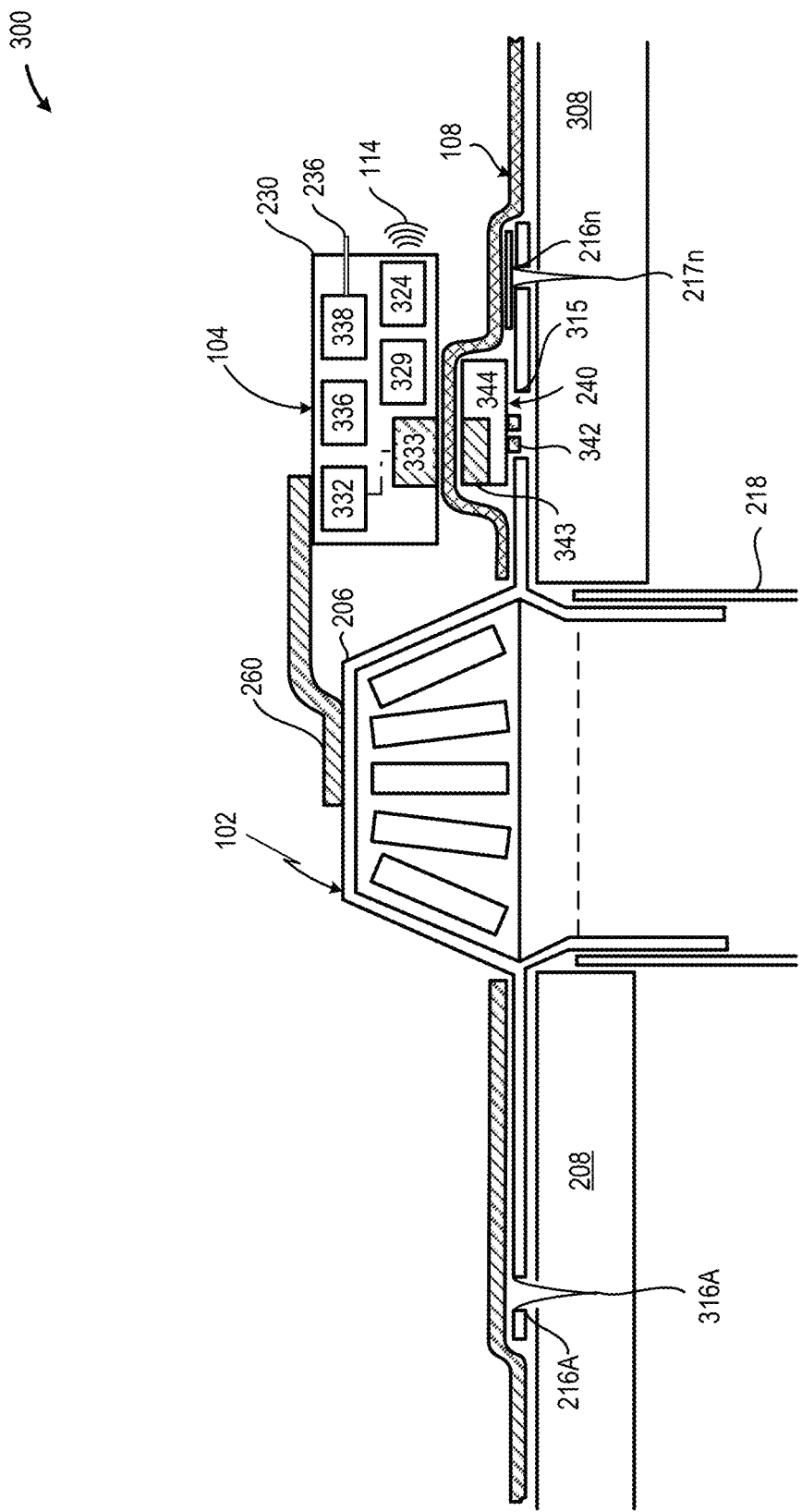
FIG. 3 is a cross-sectional elevation that depicts an illustrative roof drain system installation on a roof that includes a roofing membrane, in accordance with at least one embodiment described herein.

FIG. 2 depicts a perspective view of an illustrative roof drain system 200 consistent with at least one example of the present disclosure. FIG. 3 depicts a cross-sectional elevation of an illustrative roof drain system 200 installation on a roof 108 that includes a roofing membrane 112 consistent with at least one example of the present disclosure. Turning to FIG. 2 and FIG. 3, the roof drain 102 allows water collecting on and/or flowing across the roof 108 of the building 110 to drain off of the roof 108 to a retention pond, storm sewer system, or similar stormwater collection and/or retention system. The roof drain 102 includes a drain plate 202, one or more drain openings 204, and one or more drain caps 206. The drain plate 202 may be configured to be secured to the roof 108 of the building 110, for example, to a roof substructure 308 (such as a wood, metal, concrete, insulation, or composite substructure) disposed beneath the roofing membrane 112. The drain plate 202 may include an upper surface 212 and a generally oppositely disposed lower surface 214. As used herein, the upper surface 212 of the drain plate 202 refers to the surface of the drain plate 202 disposed proximate the roofing membrane 112 and the lower surface 214 of the drain plate 202 refers to the surface of the drain plate 202 disposed proximate the roof substructure 308. In the illustrated example, the drain plate 202 may include a generally planar member; however, it should be appreciated that one or more portions of the drain plate 202 may have a concaved and/or convex shape. For example, at least a portion of the drain plate 202 may have a concave upper surface 212 to facilitate the flow of water towards the drain opening 204.

With reference to FIG. 3, in embodiments, one or more water seepage detection modules 240 may be disposed proximate the upper surface 212 of the drain plate 202. The water seepage detection module 240 may be flush with the drain plate/flange 202. In embodiments, the water seepage detection module 240 may include a generally planar structure having an upper or first surface and a transversely opposed lower, or second surface. A secondary coil, such as an antenna system 343, is disposed in, on, or about the first surface of the water seepage detection module 240. Water seepage detection circuitry 344 and one or more water seepage sensors 342 may be disposed in, on, or about the second surface of the water seepage detection module 240. In embodiments, one or more waterproof layers or coatings may be applied to the second surface of the water seepage detection module 240. In such embodiments the one or more seepage detection sensors 342 extend from the surface of the water seepage detection module 240 and may additionally extend partially or completely through an aperture 315 that penetrates the drain plate 202 such that the one or more seepage detection sensors 342 are disposed at or near the roof substructure 308. The one or more seepage detection sensors 342 detect the presence of moisture and/or water (including, but not limited to, humidity) between the roof substructure 308 and the roofing membrane 112 (i.e., the presence of water or moisture beneath the roofing membrane 112 that may potentially cause damage to the underlying roof substructure 308). In at least some embodiments, the water sensor apertures 315 extend completely through the aperture 315 formed in the drain plate 202 (e.g., from the upper surface 212 of the drain plate 202 to the lower surface 214 of the drain plate 202).

The drain plate 202 includes a plurality of fastener openings 216A-216n (collectively, "fastener openings 216"). Each of the fastener openings 216 accommodates the passage of one or more fasteners 316A-316n (screws, bolts, nails, rivets, etc.) and/or adhesives (mastic, etc.) to secure the drain plate 202 to the roofing substructure 308. The drain plate 202 may extend outwardly from the drain opening 204 to provide a sufficiently large upper surface area for the roofing membrane 112 to seal against. The exact dimensions (e.g., length and width) of the drain plate 202 may therefore depend on the intended application. By way of a non-limiting example, the drain plate 202 may be approximately 16 inches wide by 16 inches long, though this is just for illustrative purposes only, and the drain plate 202 may have any other size and/or shape known to those skilled in the art.

The drain opening 204 penetrates the drain plate 202, extending through the upper surface 212 and the lower surface 214 of the drain plate 202. In embodiments, such as depicted in FIG. 3, a discharge outlet 220 may fluidly couple the drain opening 204 to a drain conduit 218. In other embodiments, the drain opening 204 may directly fluidly couple (i.e., couple without the use of an intervening structure or device) to the drain conduit 218. A drain cap 206 may extend at least partially around one or more of the drain openings 204. The drain cap 206 may be configured to generally prevent larger objects such as leaves, rocks, animals, debris, etc. from clogging/blocking the roof drain 102. The drain cap 206 may include one or more of smaller drain cap openings 222 that allow water to pass, but generally prevent larger objects, debris, or other detritus from passing. The drain cap openings 222 may be physically smaller than the drain opening 204, and may be evenly or unevenly distributed around all or a portion of the external surface or perimeter of the drain cap 206. In one example, the drain cap 206 may have a frustoconical shape extending upwardly away from the roof 108 such that the drain cap openings 222 are at least partially vertical; however, it should be appreciated that the drain cap 206 may be substantially flush with or recessed from the upper surface of the roof 108.

The detection system 104 incorporates multiple components, including a monitoring module 230 and a water seepage detection module 240. In embodiments, the monitoring module 230 includes control circuitry 332, communications interface circuitry 324, and power supply circuitry 336. The monitoring module 230 may include a housing 232 or similar water-resistant and/or waterproof housing, such as a National Electric Manufacturer's Association NEMA 3, NEMA 3R, NEMA 3S, NEMA 4, NEMA 4X, or NEMA 6 rated enclosure. In embodiments, at least the control circuitry 332, communications interface circuitry 324, and power supply circuitry 336 may be disposed partially or completely within the housing.

In at least some embodiments, the monitoring module 230 may additionally include water level monitoring circuitry 338 to continuously, intermittently, periodically, or aperiodically detect or determine the water level standing on or flowing across the roofing membrane 112. The water level monitoring circuitry 338 may include one or more sensors, electrodes, and/or pins 236 that extend through and are exposed on an exterior surface of a housing disposed about all or a portion of the monitoring module 230. In some embodiments, the water level monitoring circuitry 338 may detect a high-water event when the water level standing on or flowing across the roofing membrane 112 exceeds a defined value. The water seepage detection module 240 includes the one or more water seepage sensors 342 and water seepage detection circuitry 344. The one or more water seepage sensors 342 detect the presence of moisture and/or water between the roofing membrane 112 and the roof substructure 308. The control circuitry 332 and the water seepage detection circuitry 344 each include antenna circuitry to enable at least the wireless transfer of power from the monitoring module 230 to the water seepage detection module 240 and the communication of data from the water seepage detection module 240 to the monitoring module 230.

As depicted in FIG. 3, the communications interface circuitry 324 generates one or more output signals 114 that may be communicated on a continuous, periodic, intermittent or event-driven basis to one or more gateways 106 and/or one or more building management systems 116. In embodiments, the one or more output signals 114 may include one or more of: information indicative of a presence of water or moisture between the roofing membrane 112 and the roof substructure 308; information indicative of the ambient temperature proximate the roof drain 102; and/or information representative of a water level proximate the roof drain 102. Thus, the detection system 104 beneficially provides an early indication of two potential issues with the roofing membrane 112 and/or roof drain 102—first, a failure that permits water to enter between the roofing membrane 112 and the roof substructure 308; and second, a failure of the roof drain 102 to provide proper drainage thereby allowing a water build-up on the roof 108. Advantageously, the water seepage detection module 240 includes a secondary coil, such as an antenna system 343, that wirelessly communicatively couples to a primary coil, such as an antenna system 333, disposed in the monitoring module 230, eliminating the need for a penetration through the roofing membrane 112 to facilitate communication between the monitoring module 230 and the water seepage detection module 240 and the transfer of power from the monitoring module 230 to the water seepage detection module 240.

The control circuitry 332 receives the output signals generated by the water seepage detection circuitry 342, the water level monitoring circuitry 338, and/or the one or more temperature sensors 339. In at least some embodiments, the control circuitry 332 causes a communication of one or more output signals 114 that may include: a unique identifier associated with the roof drain 102; information indicative of a presence of water and/or moisture between the roofing membrane 112 and the roof substructure 308; information indicative of elevated humidity in the roofing structure 308; information representative of a water level proximate the roof drain 102; and/or information representative of the ambient temperature proximate the roof drain 102. In some embodiments, the one or more output signals 114 may include information and/or data indicative of a power level (e.g., output voltage) and/or remaining energy in the power supply circuitry 336 (e.g., % remaining capacity of an energy storage device such as a battery, supercapacitor, or ultracapacitor). In some embodiments, the control circuitry 332 may generate the one or more output signals 114 on a continuous basis. In other embodiments, the control circuitry 332 may generate or cause the generation of the one or more output signals 114 on an intermittent or aperiodic basis. In yet other embodiments, the control circuitry 332 may generate or cause the generation of the one or more output signals 114 on a periodic basis, such as every 15 seconds, 30 seconds, 1 minute, 5 minutes, 10 minutes, 15 minutes, 30 minutes, 60 minutes, 6 hours, 24 hours, etc. In further embodiments, the control circuitry 332 may generate or cause the generation of the one or more output signals 114 based on events and/or value changes (such as, but not limited to, sending updates if temperature changes more than a predetermined amount). The control circuitry may generate one or more output signals 114 that include additional information such as: the current level of an energy storage device included in the power supply circuitry 336, system maintenance reminders, energy storage device replacement reminders, information indicative of a water seepage detection circuitry 342 failure, alarms, alerts, notifications, etc.

The control circuitry 332 may include one or more processor-based devices. Example processor-based devices include but are not limited to: one or more application specific integrated circuits (ASICs); one or more field programmable gate arrays (FPGAs); one or more digital signal processors (DSPs); one or more reduced instruction set computers (RISCs); one or more microprocessors, one or more controllers/microcontrollers, or similar. The control circuitry 332 may include one or more data storage circuitry that include but are not limited to: electrically erasable programmable read only memory (EEPROM) circuitry, NAND flash memory circuitry, read only memory (ROM) circuitry, and similar. In embodiments, the data storage circuitry may store or otherwise retain an operating system, programming, applications, and/or instruction sets executable by the control circuitry 332. In some implementations, the control circuitry 332 may cause the storage of one or more measured parameters (water seepage, water level, temperature, power level, etc.) in a non-transitory storage circuitry. In such implementations, the control circuitry 332 may send data associated with a defined time period as a burst data transmission via the one or more output signals 114.

In embodiments, the control circuitry 332 operably couples to an antenna system 333. The antenna system 333 may include any number and/or combination of systems, devices, components, or assemblies capable of transferring energy from the power supply circuitry 336 to the water seepage detection module 240 via the antenna system 343 disposed in the water seepage detection module 240. Further, the antenna system 333 may include any number and/or combination of systems, devices, components, or assemblies capable of unidirectionally or bidirectionally communicating one or more signals containing information indicative of at least one of: water seepage, water level, and/or temperature between the monitoring module 230 and the water seepage detection module 240. The antenna system 333 may be used to transfer power from the monitoring module 230 to the water seepage detection module 240. For example, the control circuitry 332 may transfer power, via inductive coupling and/or resonant inductive coupling, from the power supply circuitry 336 to the water seepage detection module 240 via the antenna system 333. The antenna system 333 may also support unidirectional or bidirectional communication between the monitoring module 230 and the water seepage detection module 240. In embodiments, the antenna system 333 includes a single antenna used to transfer power and support communications between the monitoring module 230 and the water seepage detection module 240. In other embodiments, the antenna system 333 includes a plurality of antennas, at least a first of which may be used to transfer power from the monitoring module 230 to the water seepage detection module 240 and at least a second of which may be used to communicate between the monitoring module 230 and the water seepage detection module 240.

The monitoring module 230 includes communications interface circuitry 324. The communications interface circuitry 324 may include one or more wired communications interfaces (universal serial bus (USB), IEEE 802.3 (Ethernet), etc.), one or more wireless communications interfaces (IEEE 802.11 (WiFi), Bluetooth®, ZigBee, Cellular GSM, Cellular CDMA, etc.), or any combination thereof. The communications interface circuitry 324 communicates information from the monitoring module 230 to one or more external locations, for example to one or more gateway devices 106. The one or more gateway devices 106 may then communicate with one or more local or remote building management systems 116, for example via a local area network (LAN), wide area network (WAN), metropolitan area network (MAN), or a worldwide area network (WWAN—the Internet). In at least some implementations, the control circuitry 332 may cause the communication via the communications interface circuitry 324 of a notification containing information indicative of an event occurrence such as detected water seepage beneath the roofing membrane 112; a high-water level condition proximate a roof drain 102; and/or potential freezing or thawing conditions that may impact the ability of the roof drain 102 to remove water from the roof 108.

The monitoring module 230 further includes power supply circuitry 336. The power supply circuitry 336 provides power to system components such as the control circuitry 332 and the water seepage detection module 240 via an inductive coupling between antenna system 333 and antenna system 343. In some embodiments, the power supply circuitry 336 may include one or more energy storage devices. Non-limiting examples of such energy storage devices include: one or more supercapacitors, one or more ultracapacitors, one or more primary (i.e., non-rechargeable) batteries, one or more secondary (i.e., rechargeable) batteries, or combinations thereof. In some embodiments, the power supply circuitry 336 may include conditioning circuitry, filtering circuitry, and/or conversion circuitry to convert the received power to a lower voltage and/or waveform suitable for use by the control circuitry 230 and/or the water seepage detection module 240. In some embodiments, the power supply circuitry 336 may include circuitry to receive power from an electrical distribution grid and convert the received power to a lower voltage and/or waveform suitable for use by the control circuitry 230 and/or the water seepage detection module 240. In some embodiments, the power supply circuitry 336 may include one or more energy collection devices, such as one or more solar cells, that collect energy and store the collected energy in an energy storage device, such as a secondary storage cell. In at least some embodiments, the power supply circuitry 336 may communicate power system status (e.g., voltage level or remaining capacity of an energy storage device) to the control circuitry 332. Upon detecting an abnormal event that may potentially compromise the operation or accuracy of the roof drain system 200, the control circuitry 332 may generate a notification that is communicated to the building management system 116 via the one or more gateways 106.

The monitoring module 230 may additionally include water level monitoring circuitry 338. In some embodiments, the water level monitoring circuitry 338 may include any number and/or combination of devices, systems, components, or assemblies capable of detecting the presence of a liquid, such as water, having a defined depth. Non-limiting examples of such detection devices include float switches, contact switches, conductivity switches, and similar. In other embodiments, the water level monitoring circuitry 338 may include any number and/or combination of devices, systems, components, or assemblies capable of providing a continuous, intermittent, periodic, or aperiodic output indicative of a water level proximate the water level monitoring circuitry 338. Non-limiting examples of such monitoring devices include: ultrasonic level measurement devices, radar level measurement devices, capacitance probe level measurement devices, and similar. The water level monitoring circuitry 338 monitors the standing (i.e., static) water level and/or the flowing water level at a location proximate the roof drain 102. Such monitoring may provide an early indication of a potential issue with the roof drain. For example, such monitoring may beneficially alert to potential plugging of the roof drain with debris prior to the roof drain becoming completely plugged with debris or detritus.

In embodiments, the water level monitoring circuitry 338 may communicate information and/or data representative of the water level proximate the roof drain 102 to the control circuitry 332 on a continuous, intermittent, periodic, or event driven basis. In embodiments, the water level monitoring circuitry 338 may include one or more point level detectors (e.g., reed switches, floats, electrical contacts) having at least one predetermined depth setpoint such that the control circuitry 332 is notified when the water proximate the roof drain 102 reaches the at least one predetermined depth. For example, the water level monitoring circuitry 338 may generate a notification or alert output when the water level proximate the roof drain reaches a predetermined level of about: 0.25 inches or greater, 0.50 inches or greater, 1 inch or greater, 1.5 inches or greater, or 2 inches or greater. In other embodiments, the water level monitoring circuitry 338 may generate a output that provides the control circuitry with a continuous, intermittent, periodic, or aperiodic indication of the water level proximate the roof drain 102. In embodiments, one or more rain or similar water detectors may be used to activate the water level monitoring circuitry 338, thereby placing the water level monitoring circuitry 338 in a STANDBY or similar low-energy consumption state when no atmospheric moisture is present and/or no moisture is present proximate the monitoring module 230. In at least some embodiments, the control circuitry 332 may include one or more temporal dead band features such that a detected high water event must exist for a defined interval prior to communicating the notification to the building management system 116 via the one or more gateways 106. For example, the control circuitry 332 may include a temporal deadband of about: 30 seconds, 1 minute, 3 minutes, 5 minutes, 10 minutes, 15 minutes, 30 minutes, 45 minutes, 60 minutes, 120 minutes, 180 minutes or 240 minutes prior to communicating the notification to the building management system 116 via the one or more gateways 106.

The drain water level signal may be representative of the level of drain water on the roof 108. It should be appreciated that the water level may not correlate to the exact amount of water present on the roof 108, but rather may represent the level of water relative to the position of the water level monitoring circuitry 338.

The monitoring module 230 may include one or more ambient temperature sensors 339 to measure the ambient temperature proximate the roof drain 102. Such information may beneficially provide notice of freezing or icing conditions that alter or impact the performance of the roof drain 102. The one or more temperature sensors 339 may include any number and/or combination of devices, systems, components, or assemblies capable of generating one or more output signals indicative of an ambient or atmospheric temperature proximate the roof drain 102. Example temperature sensors include but are not limited to one or more thermocouples, one or more resistive thermal devices (RTDs); and similar. In embodiments, the one or more temperature sensors 339 may communicate an output signal indicative of the ambient temperature to the control circuitry 332. The monitoring module 230 may include one or more internal moisture sensors inside the enclosure of the monitoring module 230.

The water seepage detection module 240 includes one or more water seepage sensors 342, the antenna system 343, and water seepage detection circuitry 344. The one or more water seepage sensors 342 may include any number and/or combination of systems, devices, components, or assemblies capable of detecting the presence of an electrically conductive fluid, such as water, between the roofing membrane 112 and the roof substructure 308 and/or elevated moisture level in substructure 308. In embodiments, the one or more water seepage sensors 342 may include a plurality of physically separated contacts that detect the presence of the electrically conductive fluid by measuring the resistance or conductivity between the physically separated contacts. The one or more water seepage sensors 342 receive power from the power supply circuitry 336 via the antenna system 333 in the monitoring module 230 and the antenna system 343 in the water seepage detection module 240. In embodiments, the one or more water seepage sensors 342 may project or extend from the lower surface of the water seepage detection module 240. In embodiments, the one or more water seepage sensors 342 may extend partially or completely through a water sensor aperture 315 through the drain plate 202. In embodiments, the drain plate 202 may include one or more antenna alignment features 234 useful for aligning the monitoring module 230 and the water seepage detection module 240 such that the antenna system 333 in the monitoring module 230 is in proper alignment with the antenna system 343 in the water seepage detection module 240. The one or more alignment features may include but are not limited to one or more raised surface features, one or more recessed surface features, one or more apertures, one or more threaded apertures to accept the insertion of a threaded fastener, or combinations thereof. In other embodiments, the monitoring module 230 may include one or more human perceptible indicators (audible, visual, tactile, etc.) to indicate when the monitoring module antenna system 333 is aligned with the water seepage detection module antenna system 343.

In embodiments, the water seepage detection circuitry 344 operably couples to an antenna system 343. The antenna system 343 may include any number and/or combination of systems, devices, components, or assemblies capable of receiving energy from the power supply circuitry 336 in the monitoring module 230. Further, the antenna system 343 may include any number and/or combination of systems, devices, components, or assemblies capable of unidirectionally or bidirectionally communicating one or more signals containing information indicative of at least one of: water seepage, water level, and/or temperature between the water seepage detection module 240 and the monitoring module 230. In embodiments, the control circuitry 332 may cause the transfer of power, via inductive coupling, from the power supply circuitry 336 to the water seepage detection module 240 via the antenna system 343. The antenna system 343 may also support unidirectional or bidirectional communication between the water seepage detection module 240 and the monitoring module 230. In embodiments, the antenna system 343 includes a single antenna used to receive power and support communications between the water seepage detection module 240 and the monitoring module 230. In other embodiments, the antenna system 343 includes a plurality of antennas, at least a first of which may be used to receive power from the monitoring module 230 and at least a second of which may be used to communicate between the water seepage detection module 240 and the monitoring module 230. Beneficially, the use of wireless power transfer and wireless communications between the monitoring module 230 and the water seepage detection module eliminates the need for a penetration through the roofing membrane 108 thereby reducing or even eliminating a potential leakage point through the roofing membrane 108.

The water seepage detection circuitry 344 includes any number and/or combination of devices, systems, components, and/or assemblies capable of receiving one or more signals from the one or more water seepage sensors 342 and communicating an output signal containing information indicative of a water seepage status to the control circuitry 332 via the antenna system 343 (such as, but not limited to, inductive signal transfer). In some embodiments, the water seepage detection circuitry 344 may cause the communication of the water seepage status output signal on a continuous basis. In other embodiments, the water seepage detection circuitry 344 may cause the communication of the water seepage status output signal to the control circuitry 332 on an intermittent or aperiodic basis. In yet other embodiments, the water seepage detection circuitry 344 may cause the communication of the water seepage status output signal to the control circuitry 332 on a periodic basis, such as every 15 seconds, 30 seconds, 1 minute, 5 minutes, 10 minutes, 15 minutes, 30 minutes, 60 minutes, 6 hours, 24 hours, etc. In further embodiments, the water seepage detection circuitry 344 may cause the communication of the water seepage status output signal to the control circuitry 332 based on predetermined events (e.g., temperature changes meeting/exceeding a threshold, rain events, snow events, wind events, or the like).

The water seepage detection circuitry 344 may include type of circuitry known to those skilled in the art. For example, the water seepage detection circuitry 344 may one or more processor-based devices and/or resistive measurements. Example processor-based devices include but are not limited to: one or more application specific integrated circuits (ASICs); one or more field programmable gate arrays (FPGAs); one or more digital signal processors (DSPs); one or more reduced instruction set computers (RISCs); one or more microprocessors, one or more controllers/microcontrollers, or similar. The water seepage detection circuitry 344 may include one or more data storage circuitry that include but are not limited to: electrically erasable programmable read only memory (EEPROM) circuitry, NAND flash memory circuitry, read only memory (ROM) circuitry, and similar. In embodiments, the data storage circuitry may store or otherwise retain an operating system, programming, applications, and/or instruction sets executable by the water seepage detection circuitry 344. In some implementations, the water seepage detection circuitry 344 may cause the storage of one or more measured parameters (e.g., water seepage information, time/date information, etc.) in a non-transitory storage circuitry. In such implementations, the water seepage detection circuitry 344 may send data associated with a defined time interval as a burst data transmission to the control circuitry 332 via the antenna system 343.

In embodiments, one or more positioning members 260 may locate the drain cap 206 relative to the monitoring module 230. In at least one example, the positioning members 260 may include magnetic locators in which the position of the drain cap 206 relative to the monitoring module 230 is based on one or more magnets, visual markers, or the like. Alternatively (or in addition), the positioning members 260 may physically couple the drain cap 206 to the monitoring module 230. In any event, the one or more positioning members 260 beneficially position the monitoring module 230 in a location such that the one or more antennas 333 in the monitoring module 230 align with the one or more antennas 343 in the water seepage detection module 240. Aligning the one or more antennas 333 in the monitoring module 230 align with the one or more antennas 343 in the water seepage detection module 240 beneficially improves signal strength and power transfer efficiency while minimizing the introduction of noise into signals communicated between the monitoring module 230 and the water seepage detection module 240.

Figure 4:
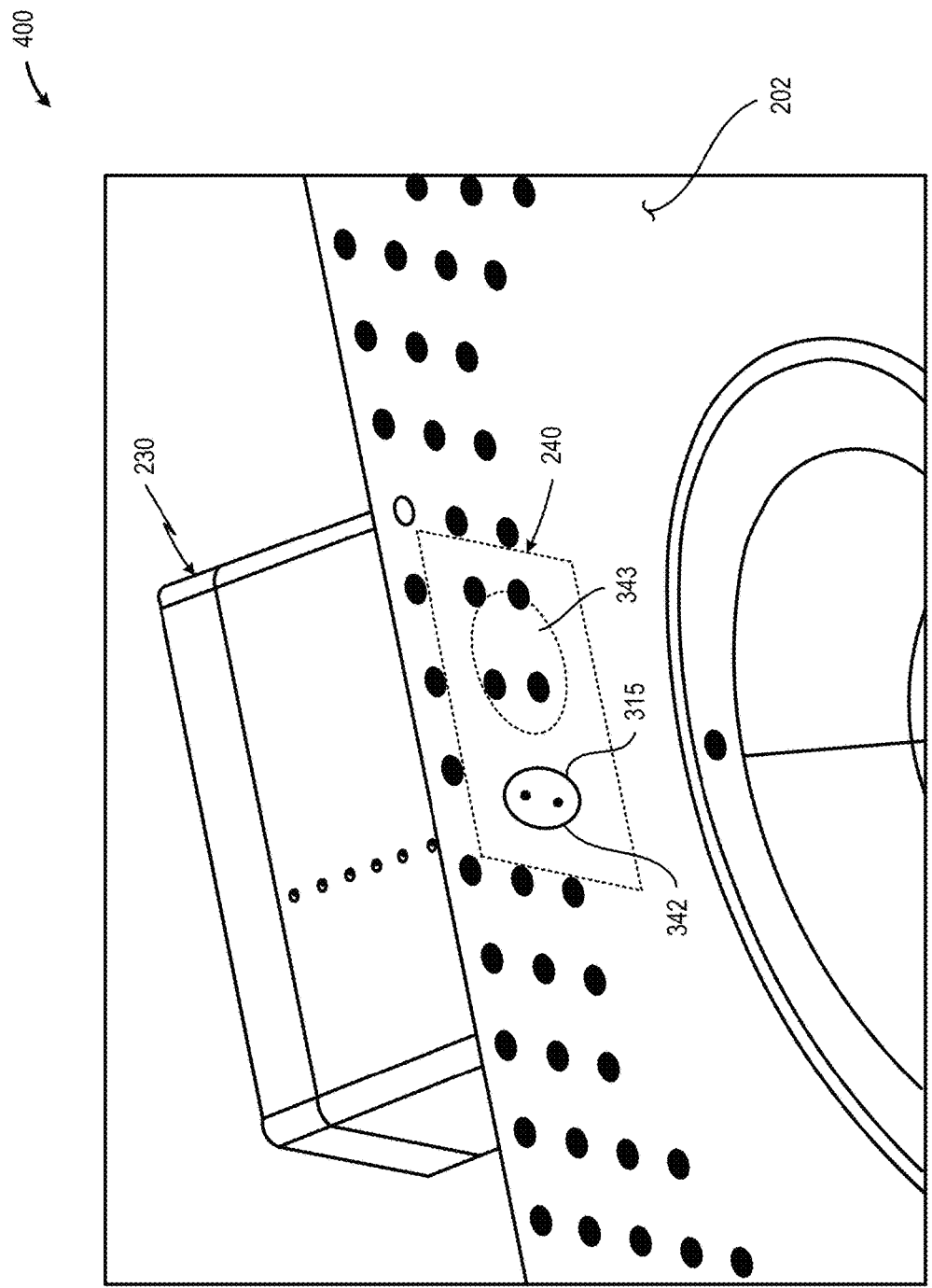
FIG. 4 is a perspective view that depicts the underside or bottom of the roof drain system depicted in FIG. 2 showing an exemplary positioning of the water seepage detection module with respect to the monitoring module such that the monitoring module antenna system is aligned with the water seepage detection module antenna system, in accordance with at least one embodiment described herein.

FIG. 4 is a perspective view depicting the underside or bottom of the roof drain system 200 depicted in FIG. 2 showing an exemplary positioning of the water seepage detection module 240 with respect to the monitoring module 230 such that the monitoring module antenna system 333 is aligned with the water seepage detection module antenna system 343, in accordance with at least one embodiment described herein. The water seepage detection module 240 is disposed proximate the upper surface 212 of the drain plate 202. The roofing membrane 112 covers the water seepage detection module 240 and the monitoring module 230 is disposed above the roofing membrane 112 proximate the water seepage detection module 240 with the monitoring module antenna system 333 aligned with the water seepage detection module antenna system 343. As depicted in FIG. 4, the water seepage sensors 342 pass at least partially through the water sensor aperture 315 formed through the drain plate 202. In embodiments, the upper surface 212 of the drain plate 202 may include one or more surface features (one or more raised features, one or more recessed features, one or more apertures, one or more detents, etc.) to assist locating the water seepage detection module 240 with respect to the water sensor aperture 315. In embodiments, the water seepage sensors 342 may extend only partially through the thickness of the water sensor aperture 315. In other embodiments, the water seepage sensors 342 may be positioned even with the lower surface 214 of the drain plate 202. In yet other embodiments, the water seepage sensors 342 may extend beyond the lower surface 214 of the drain plate 202 and/or may be placed outside the perimeter of the drain plate 202.

Figure 5:
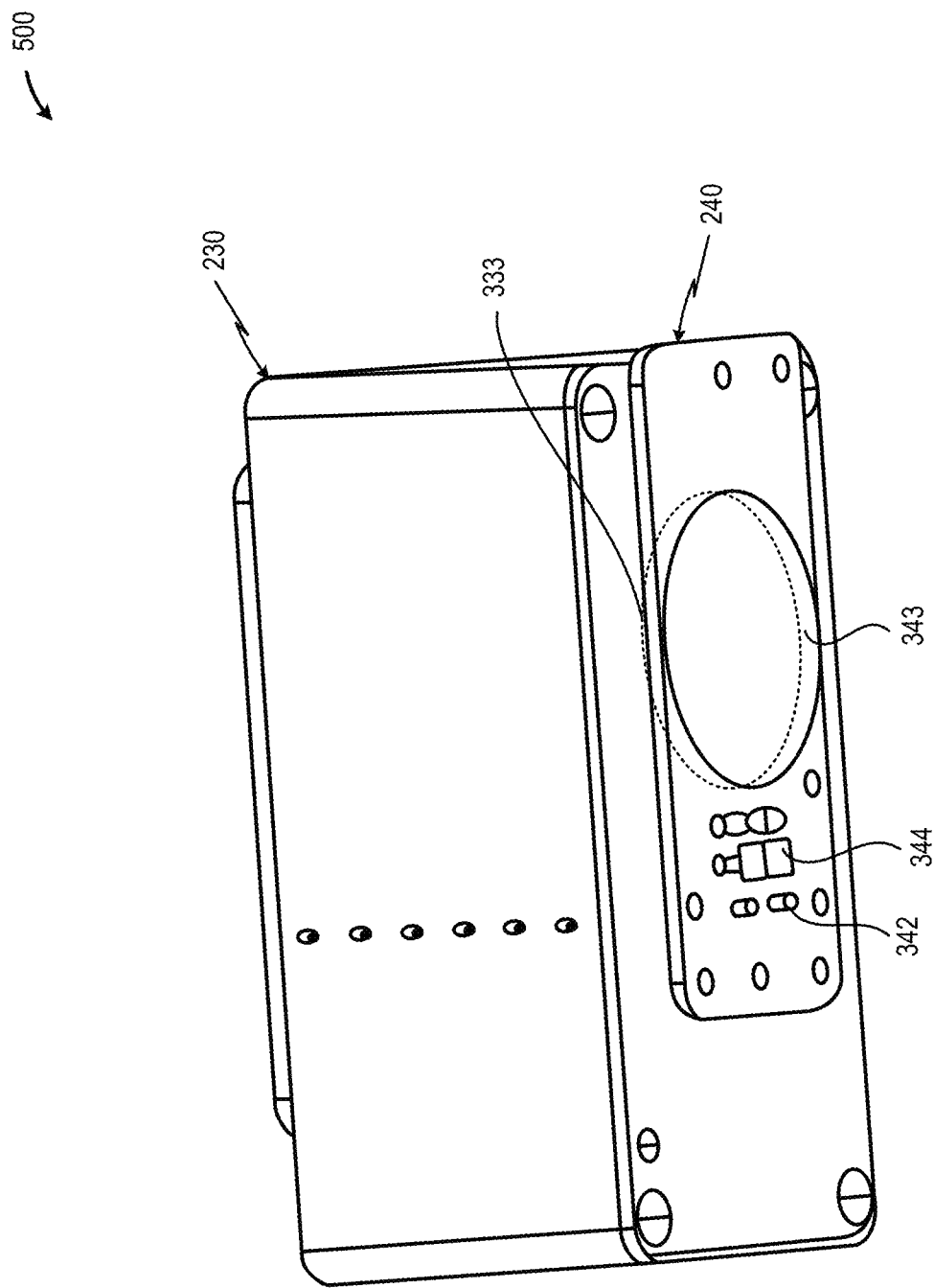
FIG. 5 is a perspective view that depicts the physical positioning of the water seepage detection module with respect to the monitoring module such that the monitoring module antenna system is physically aligned with the water seepage detection module antenna system, in accordance with at least one embodiment described herein.

FIG. 5 is a perspective view that depicts the physical positioning of the water seepage detection module 240 with respect to the monitoring module 230 such that the monitoring module antenna system 333 is physically aligned with the water seepage detection module antenna system 343, in accordance with at least one embodiment described herein. In embodiments, the physical alignment of the monitoring module antenna system 333 with the water seepage detection module antenna system 343 beneficially increases power transfer from the power supply circuitry 336 to the water seepage detection module 240. In embodiments, the physical alignment of the monitoring module antenna system 333 with the water seepage detection module antenna system 343 beneficially increases the data transmission bandwidth, reduces the data error rate, and/or reduces noise in the data transmission between the water seepage detection module 240 and the monitoring module 230. In embodiments, the roofing membrane 112 is disposed between the water seepage detection module 240 and the monitoring module 230, making it difficult to visually observe the positioning of the monitoring module 230 with respect to the water seepage detection module 240. In embodiments, to assist in properly positioning the monitoring module 230 with respect to the water seepage detection module 240, one or more surface features may be disposed in, on, about, or across the surface of the drain plate 202 to assist in a uniform positioning of the water seepage detection module 240 with respect to the drain plate 202. In addition, the one or more positioning members 260 may facilitate the uniform positioning of the the monitoring module 230 with respect to the water seepage detection module 240 such that the water seepage detection module antenna system 343 aligns with the monitoring module antenna system 333.

Figure 6:
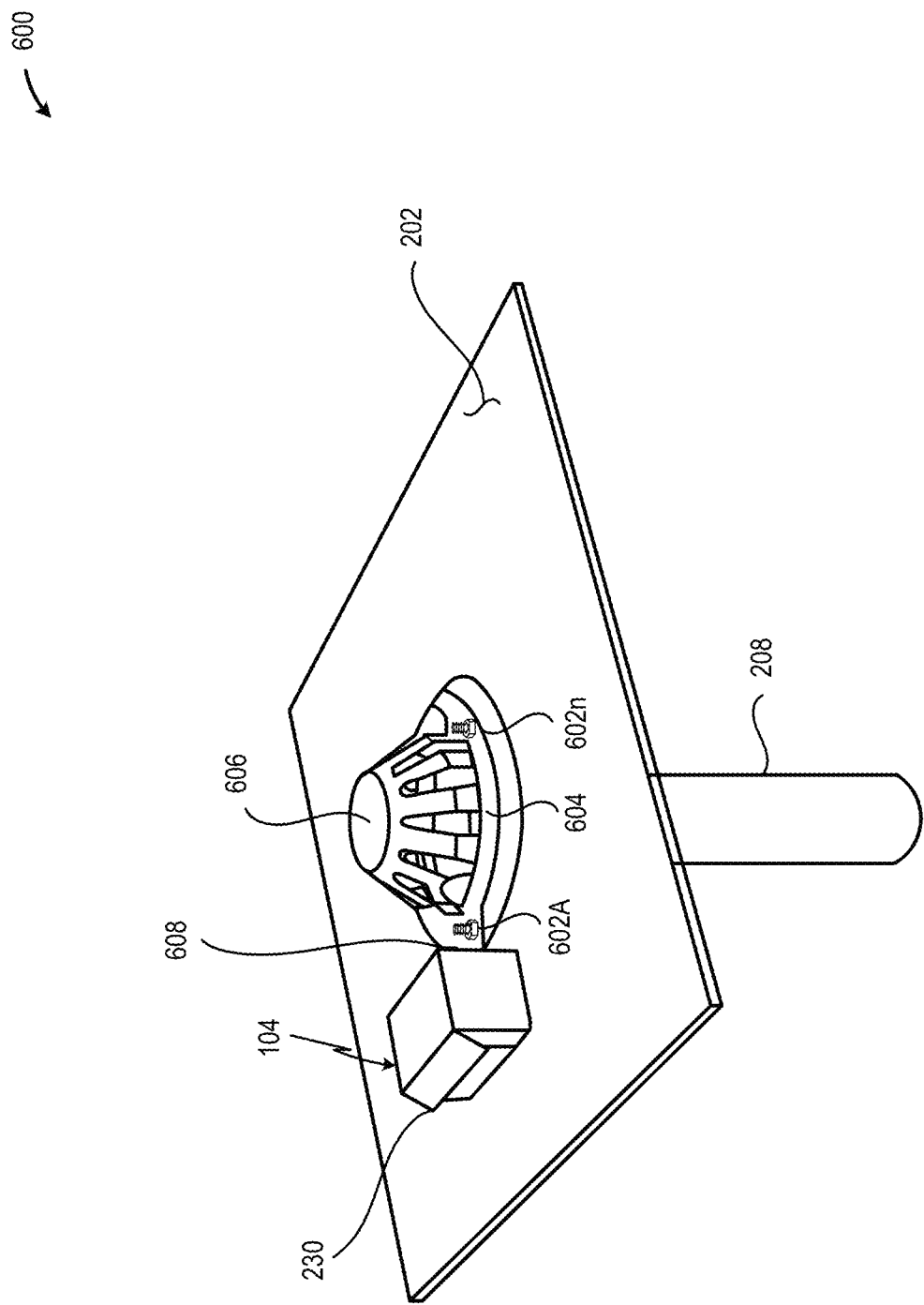
FIG. 6 is an upper perspective view of another illustrative roof drain system that includes a plurality of drain cap fasteners passing through a flange disposed at least partially about the periphery of the drain cap, in accordance with at least one embodiment described herein.

FIG. 6 is an upper perspective view of another illustrative roof drain system 600 that includes a plurality of drain cap fasteners 602A-602n (collectively, "drain cap fasteners 602") passing through a flange 604 disposed at least partially about the periphery of the drain cap 606, in accordance with at least one embodiment described herein. As depicted in FIG. 6, in at least some embodiments, a flange 604 may extend from the drain cap 606 and may be physically coupled to the drain plate 202 using a plurality of drain cap fasteners 602. In addition, a positioning member 608 may extend from the flange 604 and may physically couple to the monitoring module 230 thereby fixing the position of the monitoring module 230 with respect to the roof drain 102. In embodiments, the drain cap fasteners 602 may include one or more removable fasteners, such as one or more threaded studs and corresponding nuts or wingnuts. In some embodiments, some or all of the drain cap fasteners 602 may pass through slots or similar elongated or tapered apertures to permit a fine adjustment of the flange 604 with respect to the drain opening in the roof 108.

Figure 7A:
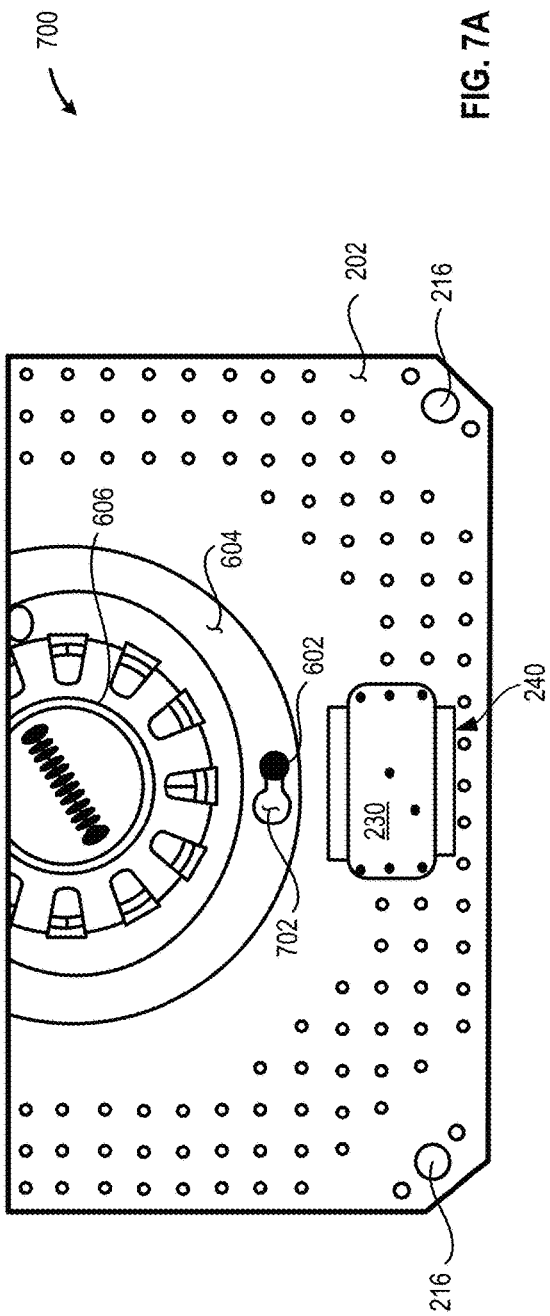
FIG. 7A is a partial top plan view that depicts an illustrative roof drain system depicting an example monitoring module disposed proximate an example water seepage detection module (the roofing membrane has been omitted for clarity to demonstrate the relationship between the monitoring module and the water seepage detection module), in accordance with at least one embodiment described herein.
Figure 7B:
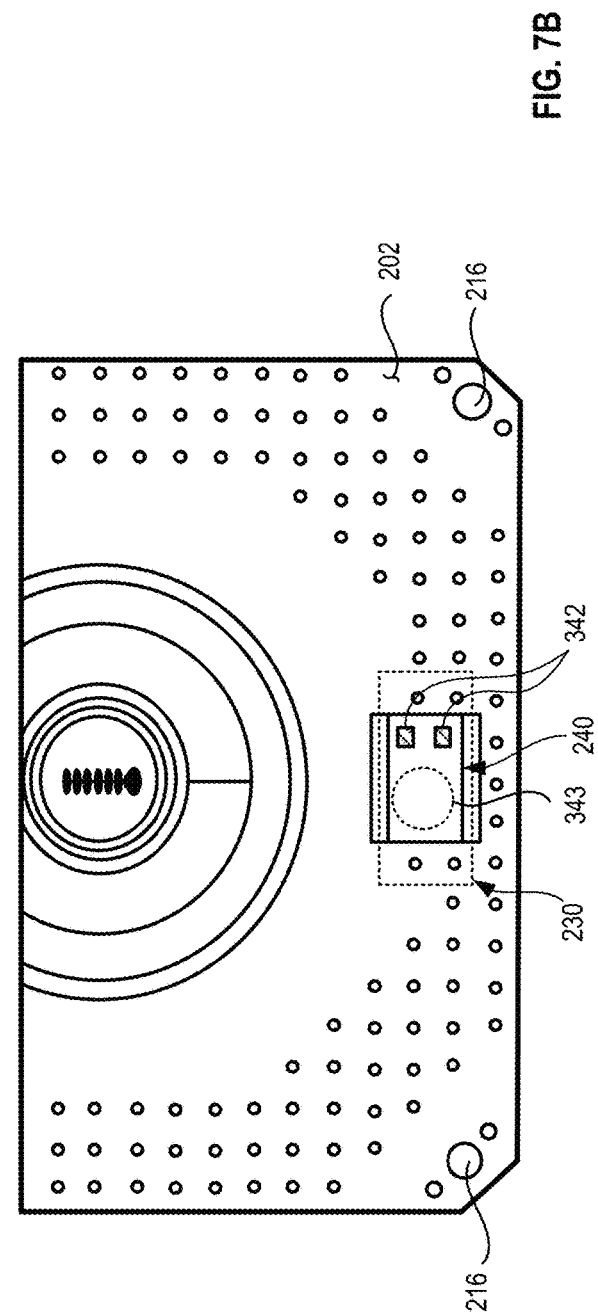
FIG. 7B is a partial bottom view of the illustrative roof drain system of FIG. 7A that depicts the positioning of the water seepage detection module with respect to the water sensor aperture, in accordance with at least one embodiment described herein.
Figure 7C:
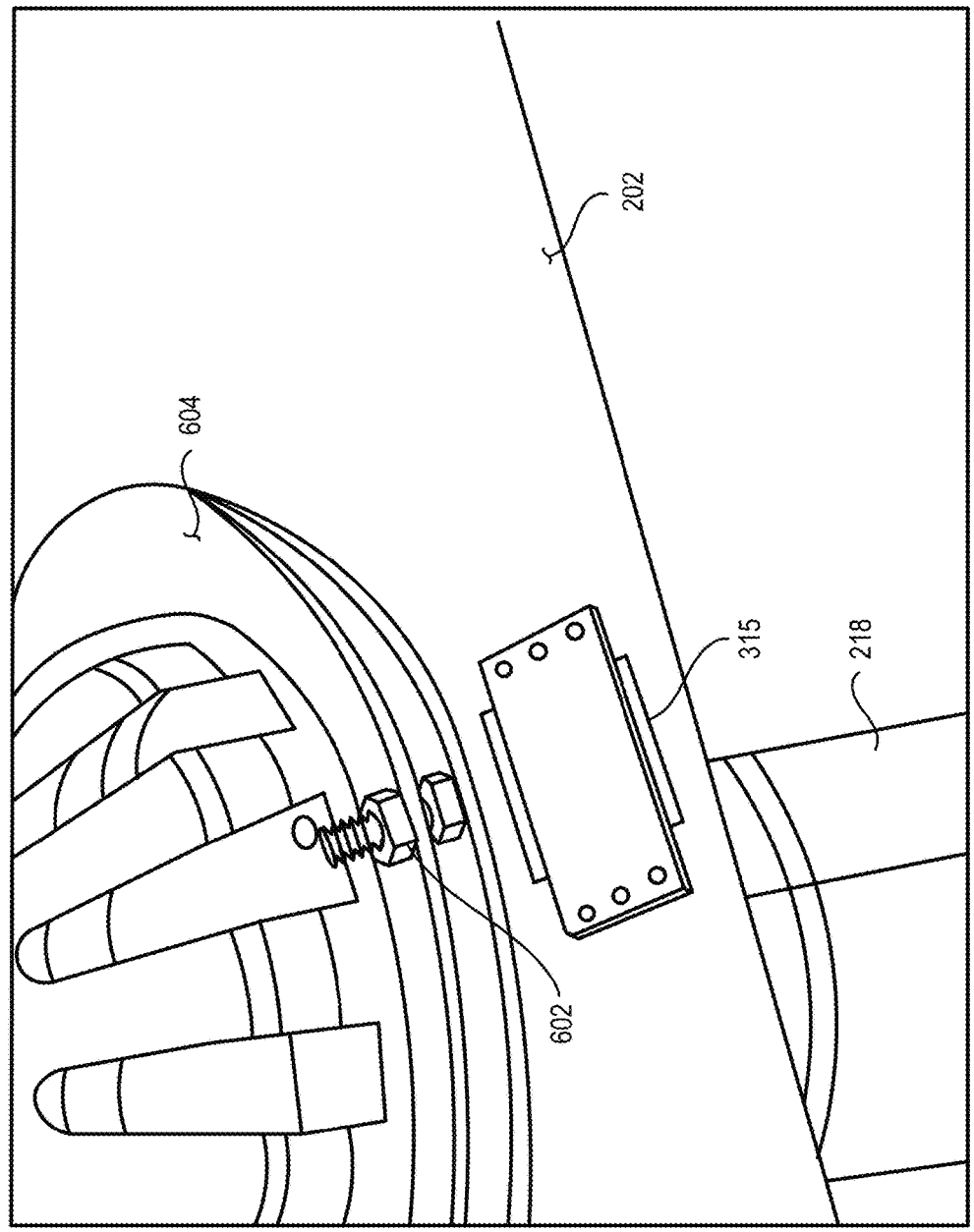
FIG. 7C is a close-up top perspective view of the water seepage detection module with respect to the water sensor aperture, in accordance with at least one embodiment described herein.

FIG. 7A is a partial top plan view that depicts an illustrative roof drain system 700 depicting an example monitoring module 230 disposed proximate an example water seepage detection module 240 (the roofing membrane 112 has been omitted for clarity and to more clearly demonstrate the relationship between the monitoring module 230 and the water seepage detection module 240), in accordance with at least one embodiment described herein. FIG. 7B is a partial bottom view of the illustrative roof drain system 700 of FIG. 7A that depicts the positioning of the water seepage detection module 240 with respect to the water sensor aperture 315, in accordance with at least one embodiment described herein. FIG. 7C is a close-up top perspective view of the water seepage detection module 240 with respect to the water sensor aperture 315, in accordance with at least one embodiment described herein.

Referring first to FIG. 7A, the monitoring module 230 is disposed above and proximate the water seepage detection module 240 such that the monitoring module antenna system 333 is aligned with the water seepage detection module antenna system 343. The water seepage detection module 240 is disposed proximate the water sensor aperture 315 formed in the drain plate 202 such that the water seepage sensors 342 are able to detect the presence of water or moisture between the roofing membrane 112 and the roof substructure 308. In some embodiments, the water seepage sensors 342 may contact the roof substructure 308. In some embodiments, the water seepage sensors 342 are disposed close to, but not in contact with, the roof substructure 308 such that a gap exists between the water seepage sensors 342 and the roof substructure 308. For example, the water seepage sensors 342 may be disposed such that a gap of about: 0.0156 inches (1/64"), 0.0312 inches (1/32"), 0.0625 inches (1/16"), 0.125 inches (1/8"), or 0.25 inches (1/4") inch exists between the water seepage sensors 342 and the roof substructure 308.

Referring next to FIG. 7B and FIG. 7C, the water seepage detection module 240 is disposed proximate the water sensor aperture 315 formed in the drain plate 202 and positioned such that the water seepage sensors 342 have an unobstructed path to the roof substructure 308. As depicted in FIG. 7B and FIG. 7C, in some embodiments, the water sensor aperture 315 formed in the drain plate 202 may be larger in width than the corresponding width of the water seepage detection module 240. In other embodiments, not shown in FIG. 7B and FIG. 7C, the water sensor aperture 315 formed in the drain plate 202 may be sufficiently large to allow the unobstructed passage of the water seepage sensors 342, but smaller in width than the corresponding width of the water seepage detection module 240. The water seepage detection module 240 may be physically coupled to the drain plate 202. For example, the water seepage detection module 240 may be non-detachably attached to the drain plate 202 using one or more chemical adhesives, one or more thermally set adhesives, one or more electromagnetically set adhesives (e.g., UV set adhesives), one or more rivets, or combinations thereof. In another example, the water seepage detection module 240 may be detachably attached to the drain plate 202 using one or more removable fasteners, such as one or more threaded fasteners, one or more camlock connectors, one or more spiral cam fasteners (e.g., DZUS® fasteners) or combinations thereof.

Figure 8A:
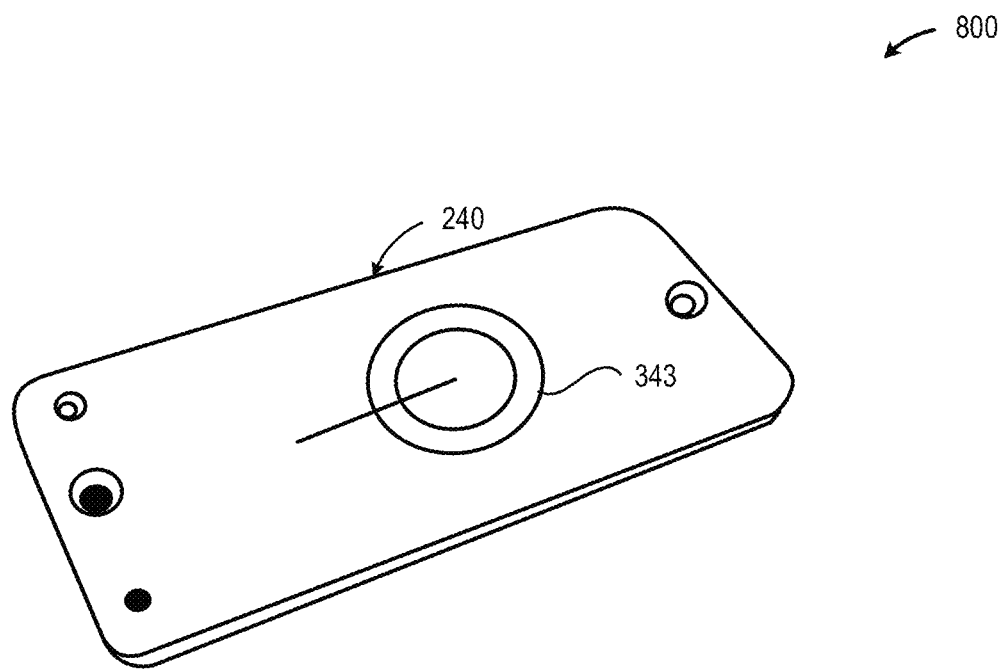
FIG. 8A is a top perspective view that depicts an illustrative water seepage detection module, the water seepage detection module antenna system is visible on the upper surface of the water seepage detection module, in accordance with at least one embodiment described herein.
Figure 8B:
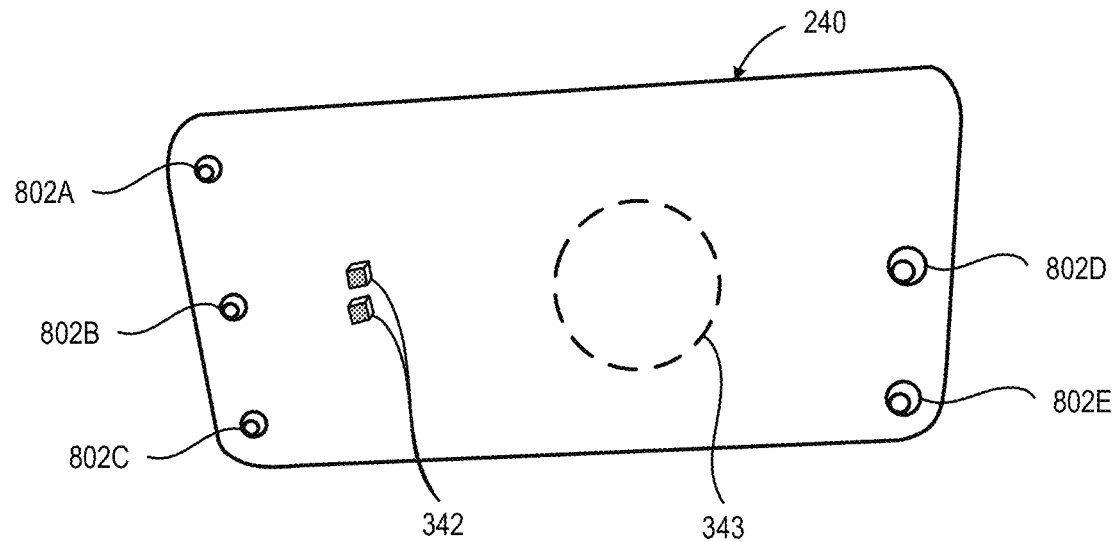
FIG. 8B is a bottom perspective view that depicts the lower surface of the illustrative water seepage detection module depicted in FIG. 8A, the water seepage sensors are visible extending from the lower surface of the illustrative water seepage detection module also visible are a plurality of water seepage detection module locator features, in accordance with at least one embodiment described herein.

FIG. 8A is a top perspective view that depicts an illustrative water seepage detection module 240, the water seepage detection module antenna system 343 is visible on the upper surface of the water seepage detection module 240, in accordance with at least one embodiment described herein. FIG. 8B is a bottom perspective view that depicts the lower surface of the illustrative water seepage detection module 240 depicted in FIG. 8A, the water seepage sensors 342 are visible extending from the lower surface of the illustrative water seepage detection module 240 also visible are a plurality of water seepage detection module locator features 802A-802n (collectively, "locator features 802"), in accordance with at least one embodiment described herein. The water seepage detection module 240 may be a sealed module that is positioned between the drain plate 202 and the roofing membrane 112. In embodiments, the plurality of water seepage detection module locator features 802 may be disposed to form a unique pattern that corresponds to a plurality of complimentary features formed in the drain plate 202. In embodiments, the plurality of water seepage detection module locator features 802 may permit the permanent or detachable attachment of the water seepage detection module 240 at a defined location and in a defined physical orientation with respect to the roof drain 102. In at least one example, the water seepage detection module locator features 802 may include a plurality of raised features as depicted in FIG. 8B and the corresponding surface features in the drain plate 202 may include a plurality of detents.

Figure 9:
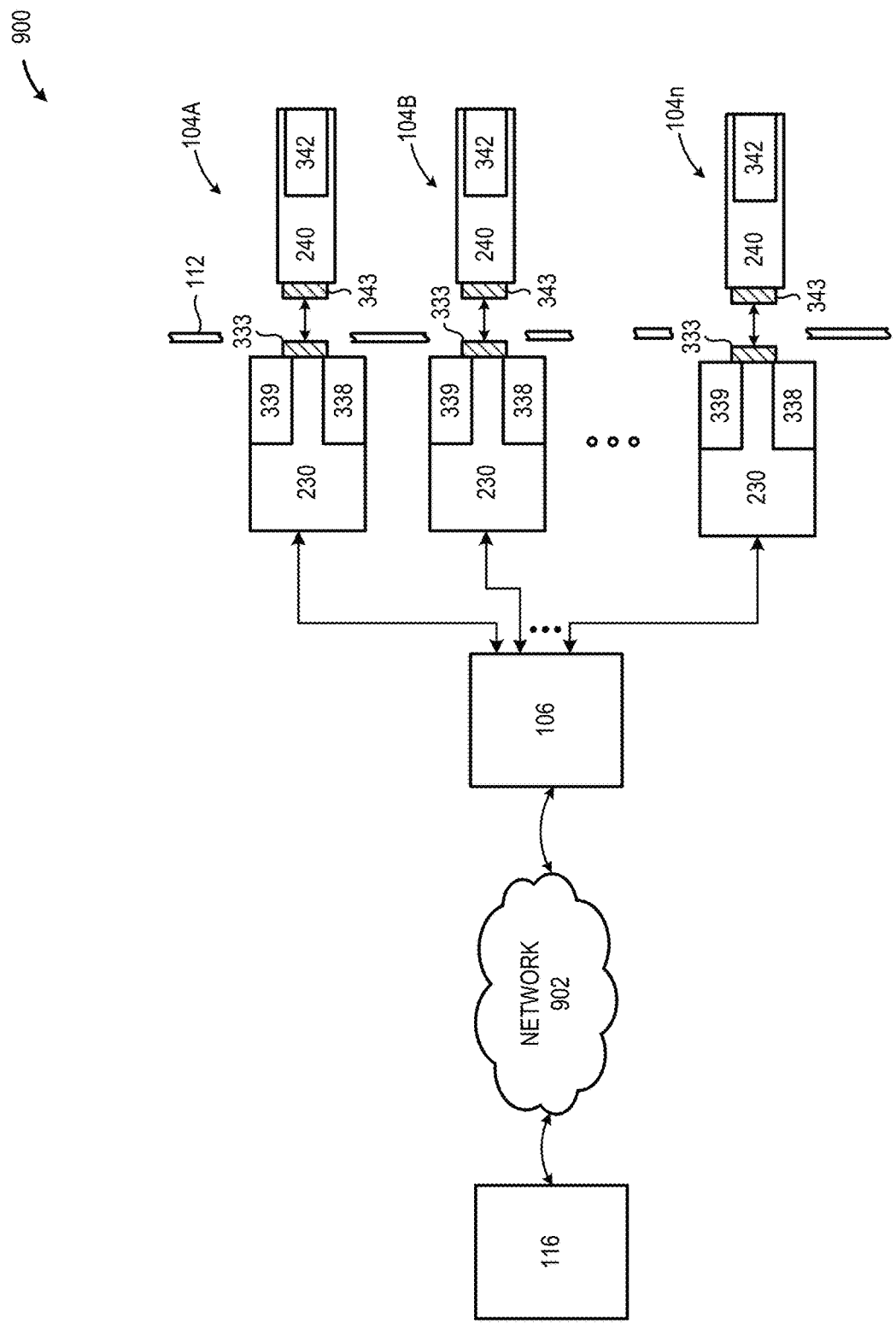
FIG. 9 is a schematic diagram that depicts an illustrative system in which a plurality of detectors are communicatively coupled to a gateway using a short-range wireless communication protocol and in which the gateway communicatively coupled to a building management system using a long-range wireless communication protocol, in accordance with at least one embodiment described herein.

FIG. 9 is a schematic diagram that depicts an illustrative system 900 in which a plurality of detectors 104A-104n (collectively, "detectors 104") are communicatively coupled to a gateway 106 using a short-range wireless communication protocol and in which the gateway 106 communicatively coupled to a building management system 116, in accordance with at least one embodiment described herein. The gateway 106 receives information and/or data from some or all of the detectors 104. Logic circuitry communicatively coupled to the gateway 106 may use all or a portion of the information and/or data received from the detectors 104 and one or more algorithms to identify those detectors 104 coupled to a roof drain 102 that may be partially or completely blocked or otherwise obstructed by debris. The logic circuitry communicatively coupled to the gateway 106 may use all or a portion of the information and/or data received from the detectors 104 and one or more algorithms to identify those detectors 104 in which the one or more sensors, electrodes, and/or pins 236 communicatively coupled to the water level monitoring circuitry 338 in the detector 104 has failed, for example by becoming partially or completely blocked or otherwise obstructed by debris (leaves, paper, plastic, etc.) leading to inaccurate water level readings proximate the roof drain 102.

As depicted in FIG. 9, each gateway 106 provides an interface between the detectors 104 and the building management system 116. In at least some embodiments, the building management system 116 may be disposed in a location remote from the gateway 106 and one or more wired and/or wireless networks 902 may be used to communicatively couple the gateway 106 to the building management system 116 using one or more long-range wireless communication protocols. The one or more networks 902 may include any number and/or combination of networks. Example networks include one or more local area networks (LANs), one or more wireless local area networks (WLANs) one or more wide area networks (WANs), one or more worldwide area networks (WWAN—the Internet), or combinations thereof. Communication between the gateway 106 and the building management system 116 may use a standard communication protocol (e.g., IEEE 802.3-Ethernet and/or IEEE 802.11-WiFi) or a closed or proprietary communication protocol. The gateway 106 communicates some or all of the data gathered by the detectors 104A-104n to the building management system 116. Such data may include unique identification data for each detector, temperature data from some or all of the detectors, water seepage data from some or all of the detectors 104, and/or water level data from some or all of the detectors 104. In embodiments, the gateway 106 may push data to the building management system 116 on a continuous, intermittent, periodic, aperiodic, or event-driven basis. In other embodiments, the building management system 116 may pull data from the gateway 106 on a continuous, intermittent, periodic, aperiodic, or event-driven basis.

The gateway 106 communicatively couples to one or more detectors 104 using one or more short-range wireless communication protocols. In embodiments, the gateway 106 may communicatively couple to 2 or more detectors 104, 4 or more detectors 104, 8 or more detectors 104, or 16 or more detectors 104. In embodiments, the detectors 104 may communicatively couple to the gateway 106 via one or more wired networks, one or more wireless networks, or any combination thereof. In at least some embodiments, the detectors 104 may include a LoRa wireless communications interface circuitry 324 to communicate with the gateway 106. The LoRa wireless communications interface circuitry 324 communicates via a low-power, wide area network (LPWAN). In other embodiments, the detectors 104 may include any type of wired or wireless interface circuitry. In embodiments, some or all of the detectors 104 may push data to the gateway 106 on a continuous, intermittent, periodic, aperiodic, or event-driven basis (detection of water seepage, detection of high water level, detection of potential freeze conditions, detection of potential thaw conditions, etc.). In some embodiments, the detectors 104 may push the data to the gateway 106 in response to a poll, inquiry, or similar request message transmitted by the gateway 106 to some or all of the detectors 104. In other embodiments, the gateway 106 may pull data from some or all of the detectors 104 on a continuous, intermittent, periodic, aperiodic, or event-driven basis.

Figure 10:
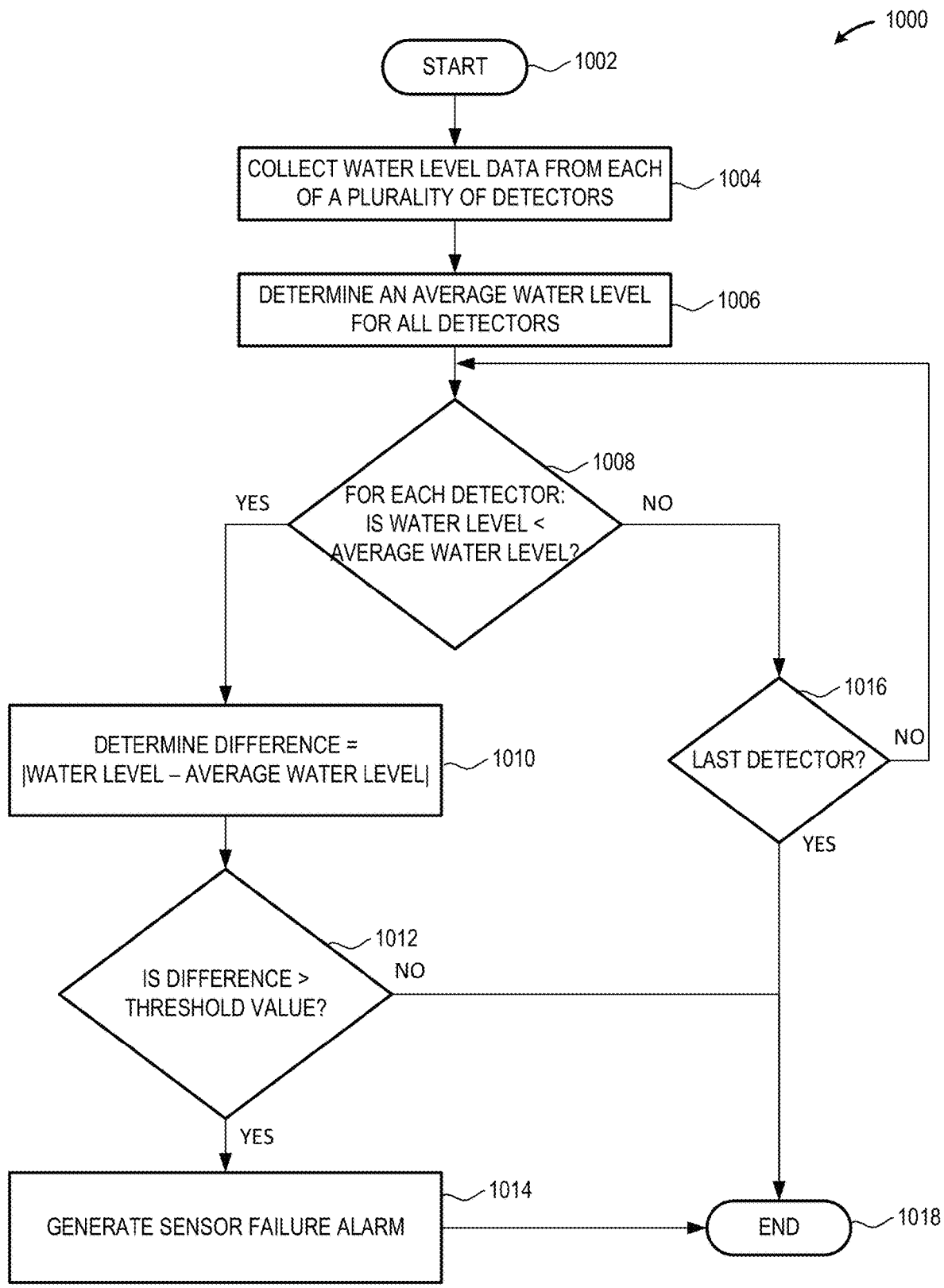
FIG. 10 is a high-level logic flow diagram of an illustrative method of detecting a failure of the one or more sensors, electrodes, and/or pins communicatively coupled to the water level monitoring circuitry in the detector; the method may be implemented by logic circuitry communicatively coupled to the gateway, in accordance with at least one embodiment described herein.

FIG. 10 is a high-level logic flow diagram of an illustrative method 1000 of detecting a failure of the one or more sensors, electrodes, and/or pins 236 communicatively coupled to the water level monitoring circuitry 338 in the detector 104; the method 1000 may be implemented by logic circuitry communicatively coupled to the gateway 106, in accordance with at least one embodiment described herein. It should be appreciated that the method 1000 may be described in combination with the illustrative intelligent roof drain system 100 described herein, the method 1000 is not limited to the illustrative intelligent roof drain system 100 and instead may be used with any connected system or method for detecting water seepage and/or water leaks.

In embodiments, the logic circuitry may be disposed in whole or in part within the gateway 106. In other embodiments, the logic circuitry may be disposed remote from the gateway 106 and communicatively coupled to the gateway 106. In embodiments, the logic circuitry may use all or a portion of the information and/or data provided by the detectors 104 to identify detectors 104 having a potentially failed sensor 236 that may compromise the accuracy of the detector. The method 1000 commences at 1002.

At 1004, the logic circuitry receives information and/or data representative of water level data from the water level monitoring circuitry 338 in each of some or all of the plurality of detectors 104. In embodiments, the information and/or data representative of water level data may be communicated to the logic circuitry on a continuous, intermittent, periodic, or aperiodic basis. In embodiments, the logic circuitry may include memory or data storage circuitry to store all or a portion of the information and/or data representative of water level data provided by each of the detectors. In other embodiments, the logic circuitry may communicate all or a portion of the received information and/or data representative of water level data to one or more remote locations, such as a remote data storage server or similar.

At 1006, using the received information and/or data representative of water level proximate each of the detectors 104/roof drains 102, the logic circuitry generates a value representative of the average water level proximate all or a portion of the plurality of detectors 104/roof drains 102.

At 1008, the logic circuitry determines, for each of the plurality of detectors 104, whether the water level proximate the respective detector 104/roof drain 102 pair is less than the average water level determined at 1006. Responsive to a logic circuitry determination that the water level proximate the respective detector 104 is less than the average water level determined at 1006, the method 1000 proceeds to 1010. Responsive to a logic circuitry determination that the water level proximate the respective detector 104 is greater than the average water level determined at 1006, the method 1000 proceeds to 1016.

At 1010, responsive to a determination by the logic circuitry that the water level proximate the respective detector 104 is less than the average water level determined at 1006, the logic circuitry determines a difference between the average water level and the water level proximate the respective detector 104.

At 1012, the logic circuitry determines whether the difference between the average water level and the water level proximate the respective detector 104 calculated at 1010 exceeds a defined threshold value. In embodiments, the threshold may be determined using the detected water level over a number of sample intervals, a mathematical algorithm that considers the water level at a first detector referenced to the water level at one or more other detectors (e.g., water level at detector 104A is usually "X" when the water level at detector 104B is "Y"±a variance and the water level at detector 104C is "Z"±a variance). Responsive to a determination at 1012 that the difference between the average water level and the water level proximate the respective detector 104 calculated at 1010 exceeds a defined threshold value (i.e., the water level data is indicative of a failed water level sensor 236), the method 1000 continues at 1014. responsive to a determination at 1012 that the difference between the average water level and the water level proximate the respective detector 104 calculated at 1010 does not exceed the defined threshold value, the method 1000 concludes at 1018.

At 1014, responsive to the determination at 1012 that the difference between the average water level and the water level proximate the respective detector 104 calculated at 1010 exceeds a defined threshold value, the logic circuitry generates one or more sensor failure alarm outputs. In at least some embodiments, the logic circuitry in the gateway 106 may communicate the sensor failure alarm to a local or remote building management system 116. The method 1000 then concludes at 1018.

At 1016, responsive to the determination that the water level proximate the respective detector 104 is greater than or equal to the average water level determined at 1006, the logic circuitry determines whether additional detectors 104 require attention to determine whether the level sensing circuitry 236 has failed. In response to additional detectors 104 requiring attention, the method 1000 continues at 1008, In response to no additional detectors 104 requiring attention, the method 1000 concludes at 1018.

Figure 11:
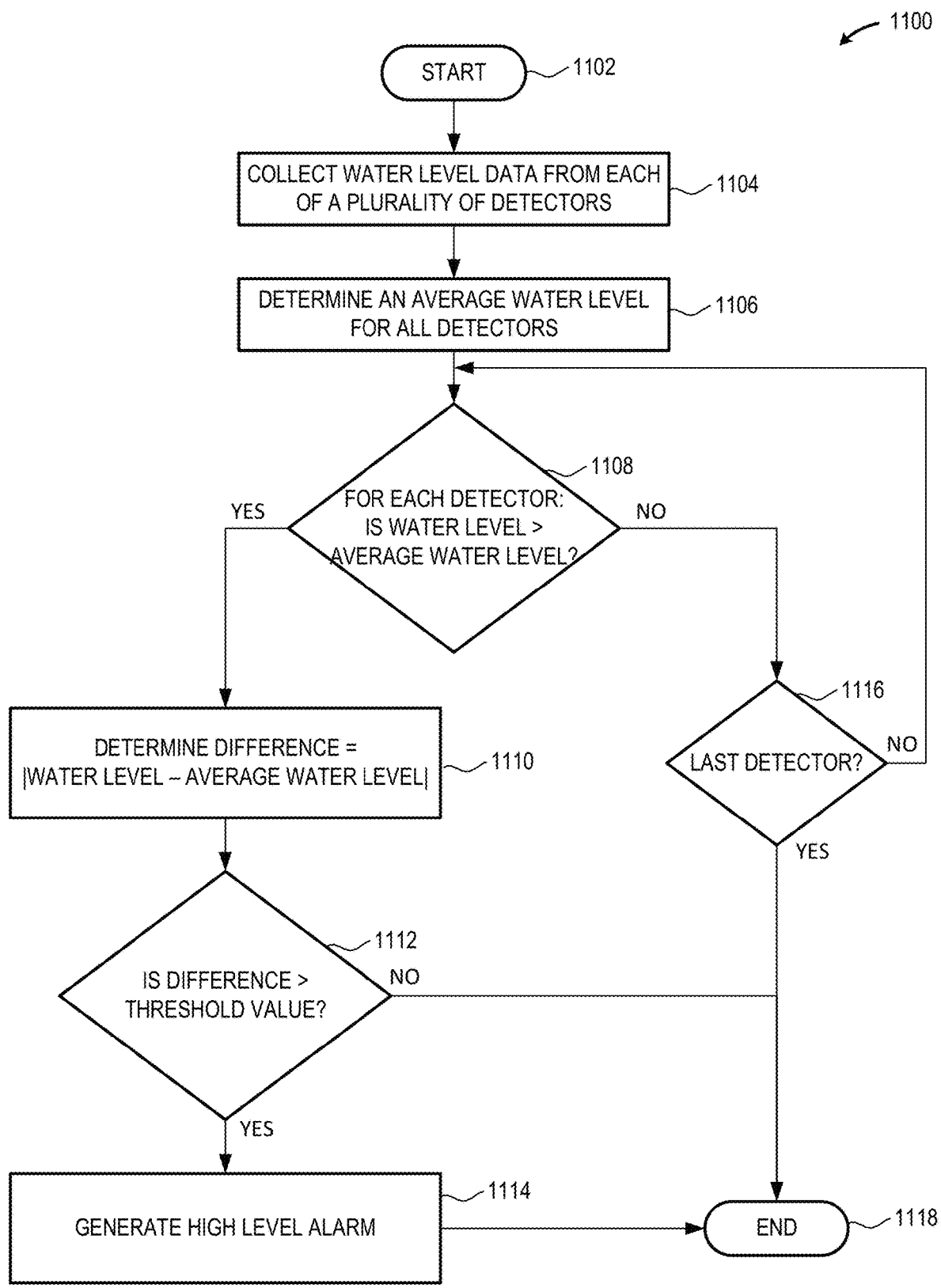
FIG. 11 is a high-level logic flow diagram of an illustrative method of detecting a partially or completely plugged or obstructed roof drain; the method may be implemented by logic circuitry communicatively coupled to the gateway, in accordance with at least one embodiment described herein.

FIG. 11 is a high-level logic flow diagram of an illustrative method 1100 of detecting a partially or completely plugged or obstructed roof drain 102; the method 1100 may be implemented by logic circuitry communicatively coupled to the gateway 106, in accordance with at least one embodiment described herein. It should be appreciated that the method 1100 may be described in combination with the illustrative intelligent roof drain system 100 described herein, the method 1100 is not limited to the illustrative intelligent roof drain system 100 and instead may be used with any connected system or method for detecting water seepage and/or water leaks. In embodiments, the logic circuitry may use all or a portion of the information and/or data provided by the detectors 104 to identify detectors 104 disposed proximate a partially or completely blocked, plugged, or obstructed roof drain 102. The method 1100 commences at 1102.

At 1104, the logic circuitry receives information and/or data representative of water level data from the water level monitoring circuitry 338 in each of some or all of the plurality of detectors 104. In embodiments, the information and/or data representative of water level data may be communicated to the logic circuitry on a continuous, intermittent, periodic, or aperiodic basis. In embodiments, the logic circuitry may include memory or data storage circuitry to store all or a portion of the information and/or data representative of water level data provided by each of the detectors. In other embodiments, the logic circuitry may communicate all or a portion of the received information and/or data representative of water level data to one or more remote locations, such as a remote data storage server or similar.

At 1106, using the received information and/or data representative of water level proximate each of the detectors 104/roof drains 102, the logic circuitry generates a value representative of the average water level proximate all or a portion of the plurality of detectors 104/roof drains 102.

At 1108, the logic circuitry determines, for each of the plurality of detectors 104, whether the water level proximate the respective detector 104/roof drain 102 pair is greater than the average water level determined at 1106. Responsive to a logic circuitry determination that the water level proximate the respective detector 104 is greater than the average water level determined at 1106, the method 1100 proceeds to 1110. Responsive to a logic circuitry determination that the water level proximate the respective detector 104 is less than the average water level determined at 1106, the method 1100 proceeds to 1116.

At 1110, responsive to a determination by the logic circuitry that the water level proximate the respective detector 104 is greater than the average water level determined at 1106, the logic circuitry determines a difference between the average water level and the water level proximate the respective detector 104.

At 1112, the logic circuitry determines whether the difference between the average water level and the water level proximate the respective detector 104 calculated at 1110 exceeds a defined threshold value. In embodiments, the threshold may be determined using the detected water level over a number of sample intervals, a mathematical algorithm that considers the water level at a first detector referenced to the water level at one or more other detectors (e.g., water level at detector 104A is usually "X" when the water level at detector 104B is "Y"±a variance and the water level at detector 104C is "Z"±a variance). Responsive to a determination at 1112 that the difference between the average water level and the water level proximate the respective detector 104 calculated at 1010 exceeds the defined threshold value (i.e., indicating a potentially plugged, blocked, or obstructed roof drain 102), the method 1100 continues at 1114. responsive to a determination at 1112 that the difference between the average water level and the water level proximate the respective detector 104 calculated at 1110 does not exceed the defined threshold value, the method 1100 concludes at 1118.

At 1114, responsive to the determination at 1112 that the difference between the average water level and the water level proximate the respective detector 104 calculated at 1010 exceeds the defined threshold value, the logic circuitry generates one or more high level alarm outputs. In at least some embodiments, the logic circuitry in the gateway 106 may communicate the high level alarm to a local or remote building management system 116. The method 1100 then concludes at 1118.

At 1116, responsive to the determination that the water level proximate the respective detector 104 is less than or equal to the average water level determined at 1106, the logic circuitry determines whether additional detectors 104 require attention to determine whether a high-level condition exists proximate the roof drain 102 associated with the respective detector 104. In response to additional detectors 104 requiring attention, the method 1100 continues at 1108, In response to no additional detectors 104 requiring attention, the method 1100 concludes at 1118.

The term substantially, as generally referred to herein, refers to a degree of precision within acceptable tolerance that accounts for and reflects minor real-world variation due to material composition, material defects, and/or limitations in manufacturing processes. Such variation may therefore be said to achieve largely, but not necessarily wholly, the target/nominal characteristic. To provide one non-limiting numerical example to quantify "substantially," such a modifier is intended to include minor variation that can cause a deviation of up to and including ±10% from a particular stated quality/characteristic unless otherwise provided by the present disclosure.

The term "coupled" as used herein refers to any connection, coupling, link or the like between elements/components. In contrast, directly coupled refers to two elements in contact with each other in a manner that does not include an intermediate element/component disposed therebetween.

The use of the terms "first," "second," and "third" when referring to elements herein are for purposes of clarity and distinguishing between elements, and not for purposes of limitation. Likewise, like numerals are utilized to reference like elements/components between figures.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that any smart drain system described herein may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A roof drain system for use with a roofing membrane of a roof substructure, the roof drain system comprising:
   a plurality of detectors, each of the plurality of detectors including:
   a water seepage detection module configured to be disposed between the roof substructure and a roofing membrane disposed proximate the roof substructure, the water seepage detection module including a water seepage sensor configured to generate a water seepage signal in response to a detection of water seepage beneath the roofing membrane;
   a water level sensor to generate a standing water level signal that includes data representative of a standing water level above the roofing membrane proximate the respective detector; and
   control circuitry to:
      wirelessly receive the water seepage signal;
      receive the standing water level signal; and
      transmit an output signal that includes data representative of the leak detection signal and the standing water level signal;
   at least one gateway communicatively coupled to the plurality of detectors, the at least one gateway including logic circuitry to:
   determine an average standing water level using data included in the standing water level signal received from each of the plurality of detectors; and
   for each of the plurality of detectors:
      determine whether a water level sensor failure has occurred using the determined average standing water level; and
      determine whether a roof drain is obstructed using the determined average standing water level.

2. The roof drain system of claim 1, the gateway logic circuitry to further, for each of the plurality of detectors:
   determine a difference between the standing water level proximate the respective detector and the determined average standing water level.

3. The roof drain system of claim 2, the gateway logic circuitry to further, for each of the plurality of detectors:
   determine whether the determined difference exceeds a defined sensor failure threshold value.

4. The roof drain system of claim 3, the gateway logic circuitry to further, for each of the plurality of detectors:
   generate a sensor failure alarm signal responsive to the determination that the determined difference exceeds the defined sensor failure threshold value; and
   communicate the sensor failure alarm signal to a remote building management system.

5. The roof drain system of claim 2, the gateway logic circuitry to further, for each of the plurality of detectors:
   determine whether the determined difference exceeds a defined obstructed roof drain threshold value.

6. The roof drain system of claim 5, the gateway logic circuitry to further, for each of the plurality of detectors:
   generate a obstructed roof drain alarm signal responsive to the determination that the determined difference exceeds a defined obstructed roof drain threshold value; and
   communicate the obstructed roof drain alarm signal to a remote building management system.

7. A roof drain gateway, comprising:
   gateway logic circuitry to:
   determine an average standing water level above a roofing membrane using data included in a standing water level signal received from each of a plurality of detectors, wherein each of the standing water level signals includes data representative of a standing water level above the roofing membrane; and
   for each of the plurality of detectors:

determine whether a water level sensor failure has occurred using the determined average standing water level; and determine whether a roof drain is obstructed using the determined average standing water level.

8. The roof drain gateway of claim 7, the gateway logic circuitry to further, for each of the plurality of detectors:
determine a difference between the standing water level proximate the respective detector and the determined average standing water level.

9. The roof drain gateway of claim 8, the gateway logic circuitry to further, for each of the plurality of detectors:
determine whether the determined difference exceeds a defined sensor failure threshold value.

10. The roof drain gateway of claim 9, the gateway logic circuitry to further, for each of the plurality of detectors:
generate a sensor failure alarm signal responsive to the determination that the determined difference exceeds the defined sensor failure threshold value; and
communicate the sensor failure alarm signal to a remote building management system.

11. The roof drain gateway of claim 8, the gateway logic circuitry to further, for each of the plurality of detectors:
determine whether the determined difference exceeds a defined obstructed roof drain threshold value.

12. The roof drain gateway of claim 11, the gateway logic circuitry to further, for each of the plurality of detectors:
generate a obstructed roof drain alarm signal responsive to the determination that the determined difference exceeds a defined obstructed roof drain threshold value; and
communicate the obstructed roof drain alarm signal to a remote building management system.

13. A non-transitory storage device that includes machine-readable instructions that, when executed by gateway logic circuitry, cause the gateway logic circuitry to:
determine an average standing water level above a roofing membrane using data included in a standing water level signal received from each of a plurality of detectors, wherein each of the standing water level signals includes data representative of a standing water level above the roofing membrane; and
for each of the plurality of detectors:
determine whether a water level sensor failure has occurred using the determined average standing water level; and
determine whether a roof drain is obstructed using the determined average standing water level.

14. The non-transitory storage device of claim 13, wherein the machine-readable instructions cause the gateway logic circuitry to further:
determine, for each of the plurality of detectors, a difference between the standing water level proximate the respective detector and the determined average standing water level.

15. The non-transitory storage device of claim 14, wherein the machine-readable instructions cause the gateway logic circuitry to further:
determine, for each of the plurality of detectors, whether the determined difference exceeds a defined sensor failure threshold value.

16. The non-transitory storage device of claim 15 wherein the machine-readable instructions cause the gateway logic circuitry to further:
generate a sensor failure alarm signal responsive to the determination that the determined difference exceeds the defined sensor failure threshold value; and
communicate the sensor failure alarm signal to a remote building management system.

17. The non-transitory storage device of claim 14 wherein the machine-readable instructions cause the gateway logic circuitry to further:
determine, for each of the plurality of detectors, whether the determined difference exceeds a defined obstructed roof drain threshold value.

18. The non-transitory storage device of claim 17 wherein the machine-readable instructions cause the gateway logic circuitry to further:
generate a obstructed roof drain alarm signal responsive to the determination that the determined difference exceeds a defined obstructed roof drain threshold value; and
communicate the obstructed roof drain alarm signal to a remote building management system.

\* \* \* \* \*